(12) United States Patent
Bacthu et al.

(10) Patent No.: US 8,717,934 B2
(45) Date of Patent: May 6, 2014

(54) MULTICAST SOURCE MOVE DETECTION FOR LAYER-2 INTERCONNECT SOLUTIONS

(75) Inventors: Nataraj Bacthu, Sunnyvale, CA (US); Dhananjaya Rao, Milpitas, CA (US); Raghava Sivaramu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 13/280,940

(22) Filed: Oct. 25, 2011

(65) Prior Publication Data
US 2013/0100851 A1 Apr. 25, 2013

(51) Int. Cl.
*H04L 12/28* (2006.01)
*H04L 12/66* (2006.01)
*G06F 15/16* (2006.01)

(52) U.S. Cl.
USPC ............ 370/254; 370/352; 370/390; 709/249

(58) Field of Classification Search
USPC ................. 370/254–312, 389–392, 401–432; 709/230–249
See application file for complete search history.

(56) References Cited

U.S. PATENT DOCUMENTS

| 7,499,466 | B2 * | 3/2009 | Hundscheidt et al. ........ | 370/432 |
|---|---|---|---|---|
| 7,626,984 | B2 * | 12/2009 | Napierala ..................... | 370/389 |
| 8,107,473 | B2 * | 1/2012 | Wijnands et al. ............. | 370/392 |
| 8,166,205 | B2 * | 4/2012 | Farinacci et al. ............. | 709/249 |
| 2006/0182105 | A1 * | 8/2006 | Kim et al. ..................... | 370/389 |
| 2008/0069087 | A1 * | 3/2008 | Igoe .............................. | 370/352 |
| 2008/0101360 | A1 | 5/2008 | Napierala | |
| 2008/0186962 | A1 * | 8/2008 | Sinha ........................... | 370/389 |
| 2010/0303072 | A1 * | 12/2010 | Jokela et al. .................. | 370/390 |
| 2011/0274109 | A1 * | 11/2011 | Stevens et al. ................ | 370/390 |
| 2012/0033600 | A1 * | 2/2012 | Jo et al. ........................ | 370/312 |
| 2012/0076067 | A1 * | 3/2012 | Yao et al. ..................... | 370/312 |
| 2013/0021942 | A1 * | 1/2013 | Bacthu et al. ................. | 370/254 |

FOREIGN PATENT DOCUMENTS

WO 2009/018127 A1 2/2009

OTHER PUBLICATIONS

International Search Report and Written Opinion mailed Mar. 8, 2013 in Application No. PCT/US2012/061312, 14 pages.
Grover, D. et al. "Overlay Transport Virtualization; draft-hasmit-otv-03.txt", Draft-HASMIT-OTV-03.txt, Internet Engineering Task Force, IETF; Standardworkingdraft, Internet Society (ISOC) 4, Rue des Falaises CH—1205 Geneva Switzerland, No. 3, Jul. 12, 2011, pp. 1-27.
Ruello, N. "Overlay Transport Virtualization—BRKDCT-2049", Jan. 10, 2011, pp. 1-46, retrieved from the Internet: http://www.netcraftsmen.net/archived-documents/petes-archives/doc_download/289-2011-jan-cmug-otvbrkdct2049.pdf (retrieved Feb. 28, 2013).

* cited by examiner

*Primary Examiner* — Man Phan
(74) *Attorney, Agent, or Firm* — Merchant & Gould

(57) ABSTRACT

Methods and systems may be provided for detecting the moves of a multicast source. Sites that were previously designated as an active source may be immediately expired instead of waiting for route expiry. All multicast receiver sites may deterministically learn the new multicast source without additional LSP churn in ISIS for resolving the multicast source move conflict between the old and new source sites.

18 Claims, 22 Drawing Sheets

MULTICAST SOURCE MOVE DETECTION FOR LAYER-2 INTERCONNECT SOLUTIONS

TECHNICAL FIELD

The present disclosure relates generally to dynamic discovery and management of multicast active sources in an L2 site.

BACKGROUND

The OTV solution provides for an L2/L3 Virtual Private Network service for both unicast and multicast traffic. However, in order to optimize the multicast state and bandwidth in the service provider core, a mechanism to detect multicast source moves is desired. There is a need for a system to enable an OTV edge device in the source-site to detect multicast source moves and notify other sites such that correct data forwarding may resume as fast as possible.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure. Moreover, in the drawings, like references numerals designate corresponding parts through the several figures.

DETAILED DESCRIPTION OF EXAMPLE EMBODIMENTS

Figure 1:
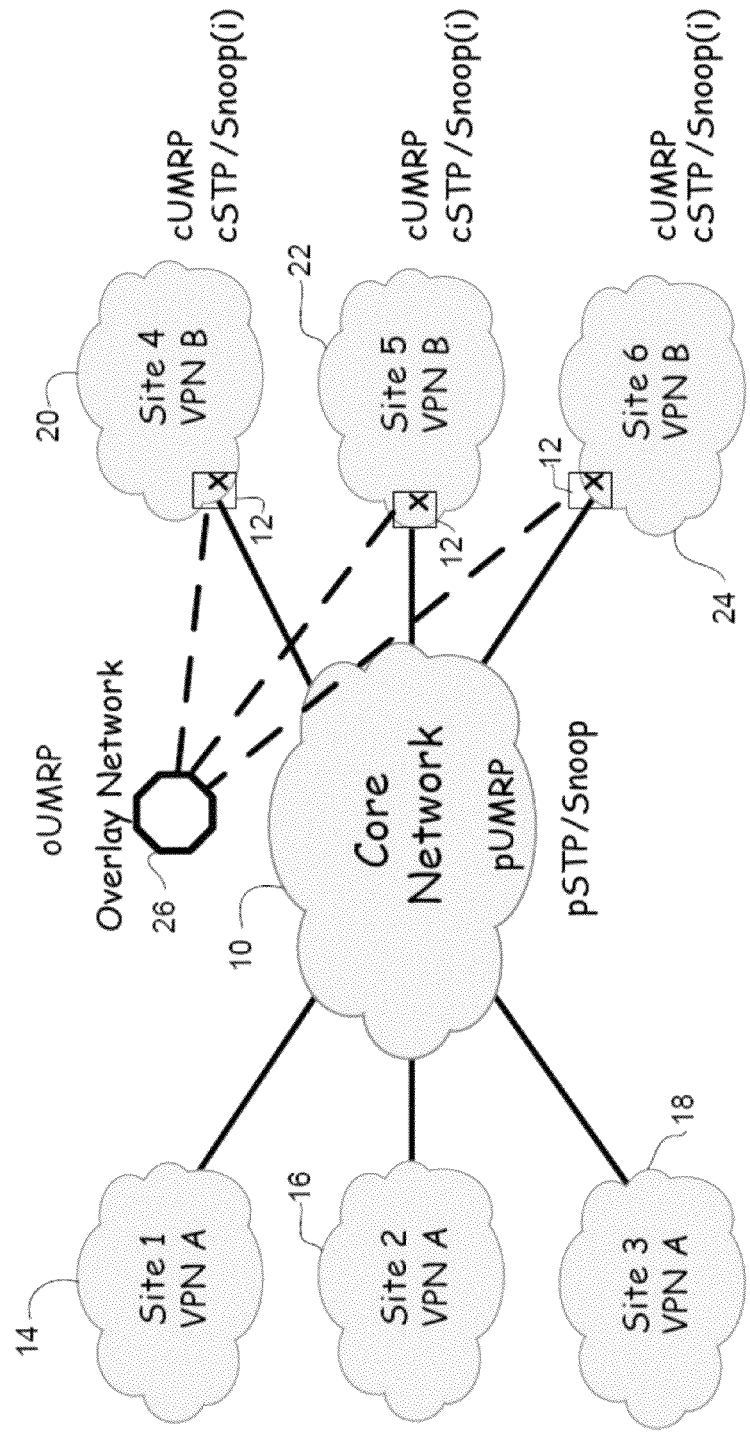
FIG. 1 illustrates an example of a network in which embodiments described herein may be implemented.

Embodiments of the present invention for multicast active source discovery may be implemented in hardware, software, firmware, or a combination thereof (collectively or individually also referred to herein as logic). To the extent certain embodiments, or portions thereof, are implemented in software or firmware, executable instructions or code for performing one or more tasks of multicast active source discovery are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent embodiments, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

In order to efficiently transport multicast traffic between L2 OTV sites across an L3 multicast service provider core, it may be desired to ensure that the traffic is only sent to receiver sites based on the receivers' interest in groups and sources. Furthermore, it may be desired to built provider multicast trees which are rooted at source sites only. This may avoid unnecessary multicast states in the core.

As such, embodiments described in this specification disclose the building of different provider multicast data trees rooted at a source site to receiver site for individual per-vlan (*,G)/(S,G) streams. G represents the group to which the traffic is directed and S refers to the source site from which the traffic originates. Building the provider multicast trees may require individual sites to discover multicast sources local to their network and subsequently announce to all receiver sites the multicast data trees to be used to deliver such traffic. Embodiments to discover such sources are described below.

The present disclosure provides an overview of OTV operations to provide an L2/L3 VPN service for both unicast and multicast traffic and uses the IS-IS link-state protocol (described below) as the overlay Interior Gateway Protocol (IGP).

Embodiments of the present disclosure may depend on the core provider network having the capability to deliver IP multicast frames originated by any L2 site. Multiple streams originated at a L2 site may be aggregated into one or more multicast delivery trees in the provider core. The mapping of site multicast streams to a delivery multicast tree in the core may be controlled by the site OTV edge device where the traffic is originated.

Overlay Transport Virtualization Overview

A method and system described herein support Layer 2 (L2) and Layer 3 (L3) virtual private networks (VPNs) over a L2 or L3 infrastructure. The method and system are referred to herein as Overlay Transport Virtualization (OTV) since they provide an "overlay" method of doing virtualization versus traditional "in-the-network" type systems, in which multiple routing and forwarding tables are maintained in every device between a source and a destination. With OTV, state is maintained at the network edges, but is not required at other devices in a network site or in a core network. OTV operates at edge devices interposed between the network sites and the core network. The edge devices perform L2 learning and forwarding functions (similar to a traditional L2 switch) on their site-facing interfaces (internal interfaces) and perform IP based virtualization functions on their core-facing interfaces, for which an overlay network is created. The dual functionality of the edge device provides the ability to connect L2 networks, L3 networks, or hybrid (L2 and L3) networks together. OTV can also run at the same time as the network sites and the core network are operating "in-the-network" virtualization via VRF (Virtual Routing and Forwarding) or VNET (Virtual Network).

OTV encapsulates L2 traffic with an IP header ("MAC in IP"), rather than creating stateful tunnels. L2 traffic that requires traversing the overlay network to reach its destination is prepended with an IP header which ensures the packet is delivered to the edge device that provides connectivity to the L2 destination in the original MAC (Media Access Control) destination header. Traffic is forwarded natively in the core network over which OTV is deployed, based on the IP header. The native IP treatment of the encapsulated packet allows optimal multi-point connectivity as well as optimal broadcast and multicast forwarding. OTV is independent of the technology deployed in the core network and no changes are required to core devices.

As described in detail below, OTV provides a state to map a given destination MAC address in a L2 VPN to the IP address of the OTV edge device behind which that MAC address is located. OTV forwarding is therefore a function of mapping a destination MAC address in the VPN site to an edge device IP address in the overlay network. A control plane is used to exchange reachability information among the different OTV edge devices. In one embodiment, the control plane uses an overlay IGP (Interior Gateway Protocol) to carry MAC addresses and IP addresses. The MAC addresses are those of hosts connected to the network and the IP next hops are the addresses of the edge devices through which the hosts are reachable through the core.

In one embodiment, the control plane utilizes IS-IS (Intermediate System-to-Intermediate System) as an IGP capable of carrying a mix of MAC unicast and multicast addresses as well as IP addresses. The information carried in IS-IS LSPs (Link State Packets) is MAC unicast and multicast addresses with their associated VLAN IDs (or VNIDs in the case of L3 VPNs) and IP next hops. Since all MAC addresses on a site are advertised in IS-IS to all other sites, all edge devices have knowledge of all MAC addresses for each VLAN in the VPN. It is to be understood that routing protocols other than IS-IS may be used, without departing from the scope of the invention.

OTV Network

Referring now to the drawings, and first to FIG. 1, an example of a network in which OTV may be implemented is shown. Some of the elements in a network that employs OTV may be routers, switches, gateways, servers, or other network devices.

The network shown in FIG. 1 comprises a virtual private network (VPN A) including three network sites; site 1 (14), site 2 (16), and site 3 (18) and VPN B including three network sites; site 4 (20), site 5 (22), site 6 (24). Each VPN is a collection of sites which are typically controlled by a single administration or organization. The addressing plan, router, and switch configuration is consistent as it would be if the sites were physically at the same location. The sites may be a single or multi-homed connected network. The network sites are in communication with other network sites through a core network 10. The core network 10 may be a L2 metro Ethernet core, L3 IP network core, or an MPLS core, for example. As previously noted, OTV is independent of the technology deployed in the core network. OTV may be implemented, for example, on any network capable of correctly forwarding IP packets.

Site 4, site 5, and site 6 each include an edge device 12, which is configured to run OTV. OTV defines an overlay network 26 coupled to each edge device 12 at the customer sites 20, 22, 24. The sites are thus connected together via the edge devices 12 that operate in the overlay network 26 and provide Layer 2 and Layer 3 connectivity among the sites.

In the example shown in FIG. 1, there is one overlay network per VPN. For simplification only one overlay network 26 is shown for VPN B. VPN A also has an overlay network coupled to edge devices of site 1, site 2, and site 3 (not shown). There may therefore be multiple overlay networks operating within a network. In the embodiments described herein, there is a single IS-IS process for each overlay network 26. However, there may also be multiple IS-IS processes running within an overlay network or on a single edge device, with each serving a different VPN. IS-IS may also be configured so that it is fault tolerant across VDCs (Virtual Device Contexts).

The network sites 20, 22, 24 may be L2 sites, L3 sites, or a combination thereof. Examples of L2 and L3 networks are described below and shown in FIGS. 7 and 8, respectively. Each client network 20, 22, 24 may run Spanning Tree. In the case where Spanning Tree is used by the client, each client network 20, 22, 24 has its own client Spanning Tree Protocol (cSTP) and its own STP root bridge. STP is not extended on the overlay network 26 since there is no need to create one large STP domain across sites. Each client network also performs its own snooping (Snoop (i)) (e.g., IGMP/MLD (Internet Group Management Protocol/Multicast Listener Discovery) snooping) at L2. IGMP/MLD reports originated at an OTV site are not forwarded on the overlay network 26.

Since OTV can work over an L2 core transport or an L3 core transport, a transport independent mechanism is provided to allow peering between edge devices 12. The edge devices include an IP address on their core facing interface and preferably join a configured ASM (Any Source Multicast)/Bidir multicast group in the core transport network 10 by sending IGMP reports. The edge devices 12 are therefore hosts relative to the core, subscribing to multicast groups that are created in the provider network and which rely on a provider Unicast/Multicast Routing Protocol (pUMRP).

In order for the OTV edge devices 12 to provide transparency to any bridged domains connected thereto and eliminate unnecessary flooding, the edge devices combine data plane learning on their bridged internal interfaces with control plane learning on their overlay interfaces. The triggering of control plane advertisements and learning by data plane events, along with the interaction of the overlay control plane with the provider control plane and the customer control plane is described below.

In one embodiment, data-plane hashing may be used so that different MAC addresses from the same VLAN can use different edge devices in an active-active capable matter.

In one embodiment, the OTV network is configured to provide encryption by the core network 10, client networks 20, 22, 24, or edge devices 12. Edge devices 12 may maintain security associations directly amongst themselves and may use an L2 and L3 encryption scheme. For example, the edge devices may provide IPsec (IP Security) encryption or Linksec encryption.

Control Planes

OTV leverages three control planes which support each other while operating independently. A provider control plane enables unicast reachability among the edge devices 12 and also provides the multicast group that makes the edge devices adjacent from the overlay control plane perspective. An overlay control plane is used to exchange reachability information among different OTV edge devices 12. A client control plane may run across the overlay control plane to get the reachability necessary between client routers to establish routing adjacency in the case of L3 VPNs.

As noted above, the control planes operate independently, however, in order to optimize multicasting, multicast control plane events (e.g., reports, joins, leaves) that occur in one MRP may initiate events in another MRP so that the optimal tree is always being used to forward traffic. Also, events in the overlay control plane may be triggered by forwarding events in the client data plane.

The provider control plane includes the set of routing protocols which run in the core infrastructure to be able to deliver packets routed from the site networks 20, 22, 24. The edge devices 12 are allocated an IP address out of the core block of addresses. The multicast group that the edge devices join is referred to herein as the Provider Multicast Group (pMG). The pMG is used for edge devices to become adjacent with each other to exchange, for example, IS-IS LSPs, CSNPs, and Hellos. Thus, by virtue of the pMG, all edge devices see each other as if they were directly connected to the same multi-access multicast-capable segment for the purposes of IS-IS peering. In one embodiment, each VPN uses a unique IS-IS authentication key and a dedicated ASM/Bidir multicast group 20 (pMG) allocated by the core network. The pMG also defines a VPN, therefore, when an edge device joins a pMG, the site becomes part of a VPN. Multiple pMGs define multiple VPNs. The pMG may also be used to broadcast data traffic to all edge devices in the VPN when necessary.

In an alternative embodiment, a full mesh of tunnels can be substituted for the pMG as a way of connecting the edge devices for a given VPN in the overlay network. The configuration of these tunnels may be performed manually or through the use of a discovery mechanism. Head-end replication at the edge devices would be provided for control-plane packets and data-plane packets that need to reach all edge devices in the VPN.

The overlay control plane is referred to herein as overlay Unicast/Multicast Routing Protocol (oUMRP). In order to avoid flooding of unknown unicast packets among edge devices, OTV does not perform data-plane learning on the overlay network. Data-plane learning takes place on the internal interfaces to provide compatibility and transparency within the L2 sites connecting the OTV overlay network 26. Regardless of whether OTV is supporting L2 or L3 VPNs, the edge devices 12 appear to each VPN site to be providing L2-switched network connectivity amongst those sites.

The L2-switched overlay network 26 transparently transports the control and data plane traffic for the routed network. The routed or switched customer network is referred to herein as the client network, and cIGP (client IGP) and cUMRP (client Unicast/Multicast Routing Protocol) are used to identify the client control plane components.

MAC learning across the overlay network 26 is based on advertisement of unicast and multicast MAC addresses, which is done by the overlay control plane. The (sitefacing) MAC addresses that are locally connected to an edge device 12 are advertised in the overlay IGP to other edge devices in the VPN. The overlay IGP establishes adjacencies only between edge devices that are in the same VPN. Edge devices become part of a VPN when they join a multicast group defined in the core (provider-MRP). The Hellos and updates between overlay-IGP peers travel over the multicast group defined in the pMRP. Thus, edge devices peer with each other as if they were directly connected at L2. This peering is possible as all the traffic for the oUMRP is encapsulated with the pMRP group address and sent into the core. Thus, all edge devices in a given VPN receive the oUMRP multicast traffic as if they were all on the same segment.

The oUMRP control traffic is encapsulated with the pMRP group address corresponding to the VPN. The oUMRP is used to inform all edge devices that the subscribers to a particular group are reachable over the overlay network. In one embodiment, the edge devices 12 snoop IGMP/MLD reports and then the oUMRP notifies all edge devices in the VPN which group has been joined by sending a GM-LSP (Group Membership-Link State Packet) with the group MAC address in it. The IP multicast group address is also sent. The GM-LSP is used to store and advertise multicast MAC (mMAC) addresses learned at a site 20, 22, 24. The information conveyed by the oUMRP is used by the edge devices 12 to populate their oif list at the source site. Edge devices 12 on the receiving sites can join the corresponding (S, G) group in the provider plane (pMRP) when they snoop the IGMP/MLD traffic from the site. Thus, multicast trees are built natively in the core network 10, and not in the overlay network 26.

The edge device 12 does not participate in the provider IGP as a router, but as a host. As previously discussed, the edge device 12 has an IP address which is significant in the core/provider addressing space and joins multicast groups in the core network 10 by issuing IGMP/MLD reports. Thus, the edge device does not have an IGP relationship with the core, nor does it have any PIM adjacencies with the core. However, the edge device 12 does participate in the oUMRP and its IP address is used as a router ID and a next hop address for unicast traffic by the oUMRP. The edge device 12 does not build an IP routing table with the information received from the overlay IGP, but instead builds a hybrid table (described below) where MAC address destinations are reachable via IP next hop addresses. The edge devices 12 thus operate as IP hosts in the provider plane, MAC routers in the overlay plane, and bridges in the client bridging plane.

The following describes details of the edge device and OTV operation at the edge device, including address advertisement, forwarding, and encapsulation.

OTV Edge Device

Figure 2:
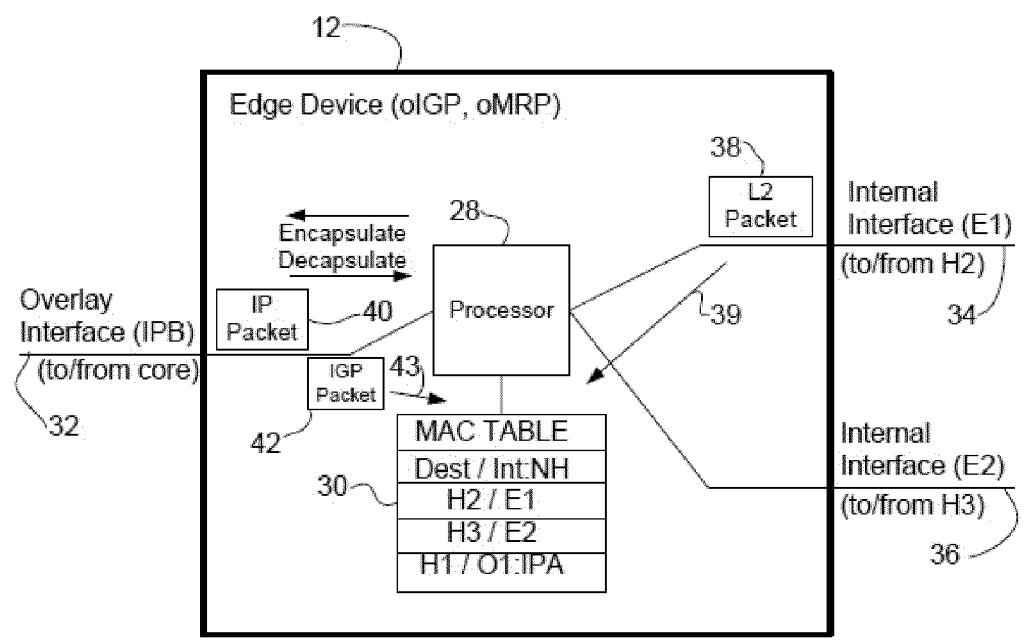
FIG. 2 is a block diagram illustrating additional details of an edge device of the network of FIG. 1, according to one embodiment.

FIG. 2 illustrates additional details of an edge device 12, according to one embodiment. The term "edge device" as used herein refers to an L2 device that performs OTV functions. The edge device 12 will typically run as a L2 device (e.g., switch) but can be co-located in a device that performs L3 routing on other L3-enabled ports. For example, the device may perform MAC learning (i.e., site-facing) to learn the MAC addresses of attached routers and run cIGP to learn about host reachability. It is to be understood that the references herein to an L2 switch include devices that perform L3 routing.

The edge device 12 may include, for example, a master central processing unit (CPU), interfaces, and a bus (e.g., a PCI bus). When acting under the control of appropriate software or firmware, the CPU is responsible for such tasks as forwarding table computations, network management, and general processing of packets. It preferably accomplishes all of these functions under the control of software including an operating system and any appropriate applications software. In one embodiment, the edge device 12 is implemented on a general purpose network machine as described below with respect to FIG. 3.

Figure 3:
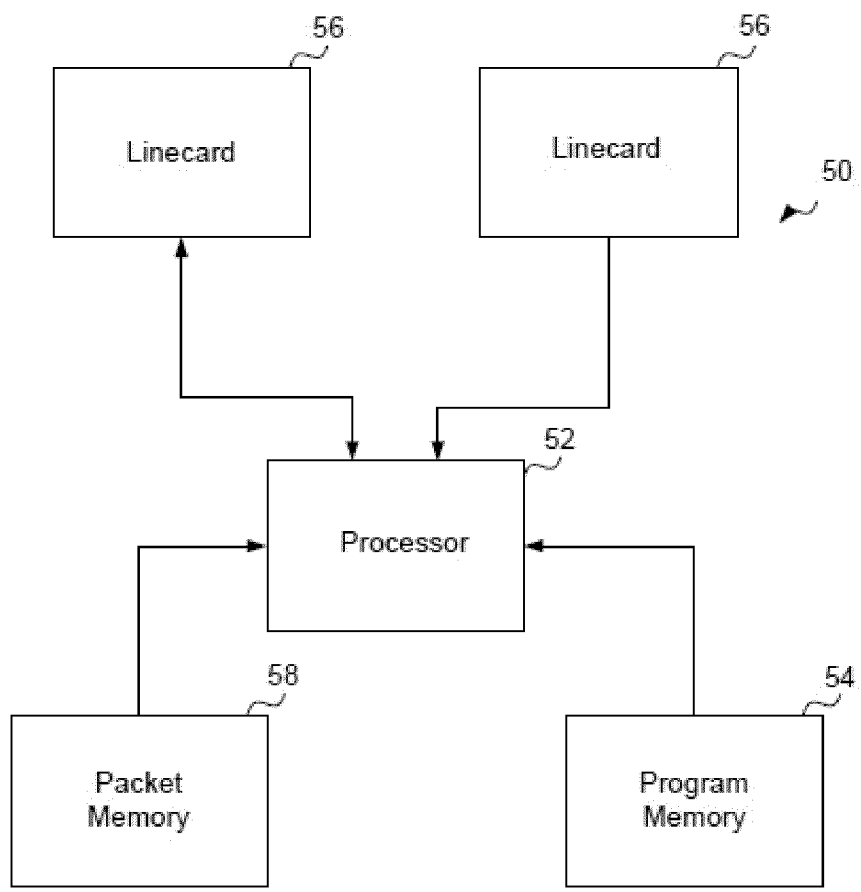
FIG. 3 depicts an example of a network device useful in implementing embodiments described herein.

FIG. 3 depicts a network device 50 that may be used to implement embodiments described herein. In one embodiment, network device 50 is a programmable machine that may be implemented in hardware, software, or any combination thereof. A processor 52 executes codes stored in a program memory 54. Program memory 54 is one example of a computer-readable medium. Program memory 54 can be a volatile memory.

Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 50 interfaces with physical media via a plurality of linecards 56. Linecards 56 may incorporate Ethernet interfaces, DSL interfaces, Gigabit Ethernet interfaces, 10-Gigabit Ethernet interfaces, SONET interfaces, etc. As packets are received, processed, and forwarded by network device 50, they may be stored in a packet memory 58. To implement functionality according to the system, linecards 56 may incorporate processing and memory resources similar to those discussed above in connection with the network device as a whole. It is to be understood that the network device shown in FIG. 3 is only one example, and that network devices having other components or configurations may be used to implement OTV, without departing from the scope of the invention.

Referring again to the example shown in FIG. 2, edge device 12 includes one or more internal interfaces 34, 36 in communication with network devices at the same network site as the edge device, and an overlay interface 32 in communication with the overlay network 26. The internal interfaces 34, 36 are L2 interfaces connected to sitebased switches or site-based routers and learn the source MAC addresses of traffic they receive. The internal interfaces 34, 36 are L2 interfaces regardless if they connect to a switch or a router. Traffic received on an internal interface may trigger oUMRP advertisements or pMRP group joins, as previously described. Traffic received on the internal interfaces 34, 36 is forwarded according to a table 30 onto another internal interface (regular bridging (or routing in the case of L3 edge device)) or onto the overlay interface (OTV forwarding).

In one embodiment, the forwarding table 30 is a MAC table of 48-bit MAC addresses. The table 30 may contain unicast MAC addresses or multicast MAC addresses. The table 30 is populated by conventional data-plane learning on internal interfaces 34, 36 and by the IS-IS protocol (or other IGP protocol) at the control plane on the overlay interface 32. Arrow 39 illustrates data-plane learning on internal interface 34 and arrow 43 illustrates control-plane learning on the overlay interface 32. The table 30 allows the same MAC address to be used in different VLANs and potentially in different VPNs. The table 30 is described further below with respect to forwarding. The overlay interface 32 is a logical multi-access multicast-capable interface and is realized by one or more physical core facing interfaces. The core facing interface 32 is assigned an IP address (e.g., IPB in FIG. 2) out of the provider/core address space. Even though the overlay interface 32 has an IP address, it does not participate in the provider IGP or UMRP, as noted above. The overlay interface 32 operates as a host connected to the core network 10. The IP address assigned to the overlay interface 32 is used as a next hop address by the oUMRP, therefore, table 30 for the overlay interface includes a remote IP address as the next hop information for remote MAC addresses. As described below, traffic transmitted out of the overlay interface 32 is encapsulated with an IP header and traffic received on this interface is decapsulated to produce an L2 frame.

In the example shown in FIG. 2, there is only one overlay logical interface 32. It is to be understood, however, that there may be any number of overlay interfaces. A processor 28 encapsulates L2 (MAC level) packets 38 from the internal interfaces 34, 36 in IP packets (with unicast or multicast headers) 40 before forwarding the packets to the core network, and decapsulates IP packets received from the core network. For example, in one embodiment a unicast frame is encapsulated in an IP unicast packet; a broadcast frame is encapsulated in an ASM/Bidir IP multicast packet; a link-local multicast frame is encapsulated in an ASM/Bidir IP multicast packet; and a customer multicast frame is encapsulated in a SSM IP multicast packet. The ASM/Bidir multicast packet is also used for IS-IS peering.

In the embodiment utilizing IS-IS, the protocol is operational on the logical interface 32 at the overlay network and, in a constrained fashion, on the internal site network interfaces 34, 36. On the overlay network, IS-IS packets are encapsulated in IP multicast packets. The full IS-IS protocol runs on the overlay link 32. The IS-IS process interacts with the L2 RIB (Routing Information Base) for adding and deleting entries (VLAN-id, MAC). On the site link 34, 36, IS-IS sends IIHs (IS-IS Hellos) for the purpose of detecting reachability inside the site and to elect a site-id. Each edge device which resides in an OTV site advertises over the overlay network the same site-ID. Site-ID election is dynamically determined by the IS-IS protocol. No flooding of LSPs or sending of CSNPs (Complete Sequence Number PDUs) are required, and no pseudo-node LSP needs to be generated for the site links 34, 36.

An edge device 12 that forwards L2 frames in and out of a site from and to the overlay interface, respectively, is an authoritative edge device. There is one authoritative edge device for all MAC unicast and multicast addresses per VLAN. For other VLANs, another edge device is authoritative. The authoritative edge device has the responsibility for forwarding frames from the site network to the overlay network to one or more remote sites, as wells as from the overlay network into the site network. The authoritative responsibility can be shared with other edge devices for other VLANs so that the traffic load can be balanced across edge devices for all VLANs. Therefore, within a VLAN OTV employs an active-backup procedure and across VLANs an active-active procedure.

Authoritative edge device selection may be made, for example, by using static VLAN-ID range assignments. In one embodiment, an edge device ordinal is assigned dynamically by the IS-IS protocol per edge device within a site. The ordinal value ranges from 0 to n−1, where n is the number of edge devices per site. Ordinals are preferably contiguously assigned across all edge devices based on IS-IS system ID. When an edge device goes down, which is detected by an IS-IS adjacency loss on the internal network, the ordinal of the down edge device is taken over ownership by the numerically lower ordinal assigned edge device which is still up.

The authoritative edge device may also be selected by mapping the VLAN-IDs to an edge device ordinal using a hash function. A hash-based scheme ensures a balanced distribution of VLANs across all edge devices, irrespective of the actual values or ranges in use. Another embodiment for selecting authoritative edge devices for load balancing across one VLAN is described below under load balancing and ECMP. It is to be understood that the selection methods described herein are only examples, and that other methods may be used to select the authoritative device.

Advertising Addresses

As previously discussed, in addition to conveying MAC address information among the edge devices in a VPN, information mapping the MAC addresses to IP addresses of an advertising edge device is conveyed for the purpose of "MAC-in-IP" forwarding across the overlay network.

When an edge device is authoritative, it advertises a unicast MAC address as soon as it learns the MAC on an internal interface. The MAC address is placed in an IS-IS LSP if the edge device is authoritative for the VLAN the MAC resides in. It should be noted that the role of being authoritative has no effect on multicast MAC addresses.

Forwarding

The following describes details of forwarding between internal links, from an internal link to an overlay link, and from an overlay link to an internal link. When an edge device forwards between internal links 34, 36 within its network site, it operates like a traditional L2 switch or L3 router (FIG. 2). The edge device 12 forwards a unicast, multicast, or broadcast packet from one of the internal links 34, 36 to the overlay link 32 when IS-IS has put the logical port of the overlay interface in the MAC table 30 for the corresponding unicast or multicast MAC address. L2 traffic which traverses the overlay network 26 to reach its destination is prepended with an IP header that ensures the packet is delivered to the edge devices that provide connectivity to the L2 destination in the original MAC header. In one embodiment, a packet as received from the internal interface 34, 36 is not changed other than to remove a preamble and FCS from the frame. The IP header, outer MAC header, and physical port the packet is to go out is preferably all cached in hardware. This is so all the information required to physically forward the packet is together to easily prepend and send data at high rates. The IP addresses and the outer MAC addresses are all preferably provided and stored for the hardware by the control-plane software.

When a packet 40 is received on the overlay interface 32, it is decapsulated to reveal the inner MAC header for forwarding. The inner MAC SA (source address) and DA (destination address) are used for the MAC table lookup described below.

FIG. 2 illustrates an example of MAC table 30 for edge device 12 having a core facing IP address of IPB and in communication via overlay interface 32 with a core network connected to another network site comprising an edge device having an IP address of IPA and a host H1 (not shown). Host H1 is reachable through edge device IPA via overlay network O1. The table 30 includes a number of estination/link pairs (or destination/next-hop pairs in the case of an L3 edge device) for forwarding between internal links (E1, E2), from internal links to overlay link 32, and from the overlay link to the internal links. The MAC table 30 is populated using the address information received in LSPs and GM-LSPs at the overlay interface 32 and packets received at internal interfaces E1, E2, as previously described with respect to advertising addresses.

The first pair (H2/E1) in table 30 specifies that host H2 is reachable through link E1. Another host H3 at the network site is reachable through internal interface 36 (E2). Thus, another entry in the table is H3/E2. Since host H1 is reachable via the overlay network O1 through the edge device with IP address of IPA, the other entry in the table is H1/O1:IPA.

The table 30 provides information used by the edge device 12 in forwarding packets received at its interfaces. For example, based on a lookup at table 30, packet 38 received at interface E1 and destined for host H1 is encapsulated in IP packet 40 with an IP header having a destination address of IPA. Packet 40 is transmitted from link 32 to the core network where it is routed (in the case of a routed core) to edge device IPA. A packet received at link 32 and destined for host H2, is stripped of its overlay IP header and forwarded to interface E1 in generally the same manner as a conventional bridge would forward a packet at L2.

It is to be understood that the table 30 shown in FIG. 2 and described above is only one example of an information base mapping addresses, and that other configurations may be used without departing from the scope of the invention. There may be cases where a VLAN will have some MACs that will be advertised and forwarded over the overlay network and others that will have their packets forwarded natively on physical interfaces. This can be controlled by policy configuration on the edge device. When a VLAN is enabled, an edge device begins advertising locally learned MAC addresses in IS-IS. If the MAC needs to be connected through the core natively, a network administrator can set up a router-filter based access-list to deny advertising the MAC. This may be used, for example, in shared services for an application.

Encapsulation

As previously discussed, OTV encapsulates traffic into an IP header which is natively handled in the IP or L2 core. Thus, rather than having logical interfaces at the edge devices representing tunnels going to different remote sites, the edge device encapsulates traffic based on its destination and transmits it from its overlay interface. Once the packet is received at the core network, core routing (in the case of a routed core) takes care of the traffic. The following describes actions that take place at the edge 15 device when an L2 frame is received that needs to be encapsulated in IP to be sent on the overlay network.

If the frame exceeds the MTU (Maximum Transmission Unit) of the physical outgoing link for the overlay network, the packet will be IP fragmented on an egress edge device and reassembled on an ingress edge device.

In one embodiment, the frame is IEEE 802.1Q encapsulated and three priority bits (IEEE 802.1p) in the Ethernet header are copied to a 3-bit IP-precedence field of the IP header. The remainder of the DSCP (Differentiated Services Code Point) field is padded with zeros, thus using Class Selector Code Points as defined in IETF RFC 2474 ("Definition of the Differentiated Services Field (DS Field) in the IPv4 and IPv6 Headers", K. Nichols et al., December 1998). Alternatively, a one-way mapping table from IEEE 802.1p to DSCP may be used instead of a direct copy.

The TTL (time to live) field in the IP header is preferably a configuration option, with a default value of 128, for example. The IP total length field is recomputed and the IP header checksum calculated. An IP option, such as ESP (Encapsulating Security Payload) or AH (Authentication Header) extension headers may be placed after the IP header so that IPsec (IP Security) can be used.

One example of encapsulation that may be used at the OTV edge device is described in IETF RFC 3378 ("EtherIP: Tunneling Ethernet Frames in IP Datagrams", R. Housley et al., September 2002). The format includes an IP header, EtherIP header, and an encapsulated Ethernet frame. The EtherIP header includes the protocol version. Other types of encapsulation that may be used at the OTV edge device are EtherIP, GRE (Generic Routing Encapsulation) and L2RPv3 (Layer 2 Tunneling Protocol Version 3).

Edge Device Placement Examples

FIGS. 4A-4E illustrate examples of OTV edge device placement within network site 20 of FIG. 1. In each example, the network 20 includes an edge device X1 (12) and one or more routers (R1, R2) and switches (S1, S2, S3). The network 20 also includes hosts H1, H2, H3, connected to switch S1, switch S2, and router R1, respectively. The link leaving the network cloud 20 is the physical link to the core infrastructure.

Figure 4A:
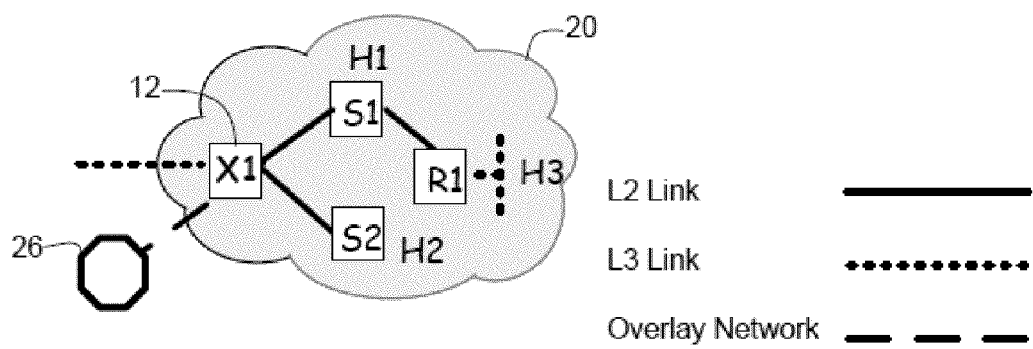
FIGS. 4A-4E illustrate examples of different edge node placements in a network utilizing embodiments described herein.

In FIG. 4A, the edge device X1 is a border switch at the network edge. The network 20 includes hosts H1, H2, H3 and a router R1 on a switched network which includes switches S1, S2, and X1 and extends to the edge of the site. The edge device X1 is attached by the exit link to an L3 infrastructure and is inline with the data path. All host MAC addresses and router MAC addresses are advertised on the overlay network 26. When hosts in the switch network join multicast groups, the multicast MAC addresses are advertised on the overlay network 26. When host H3 joins a multicast group, a PIM (Protocol Independent Multicast) join-prune message is sent by router R1 to other routers on the extended multisite switch network.

Figure 4B:
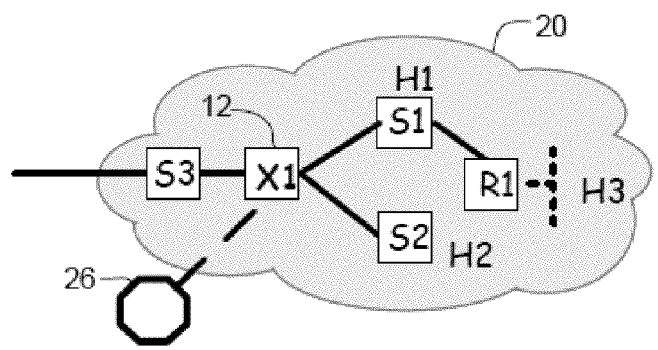

FIG. 4B illustrates an edge device X1 one-hop from border switch S3, which is on path to edge. In this configuration, the edge device X1 is inline with the data path but the exit device is a L2 switch connected to an L2 metro Ethernet core. The advertisement for unicast and multicast MAC addresses is the same as described above with respect to FIG. 4A.

Figure 4C:
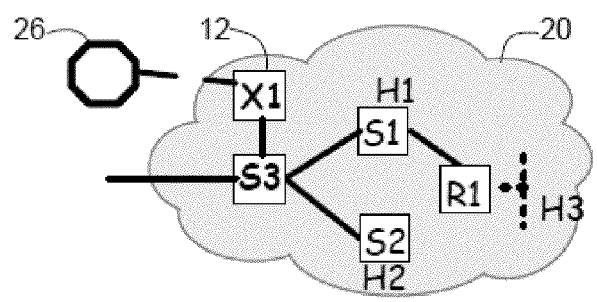

FIG. 4C illustrates an edge device X1 one-hop from border switch S3, which is not on path to edge. The configuration is similar to that described above for FIG. 4B except the edge device X1 is out of the data path.

Figure 4D:
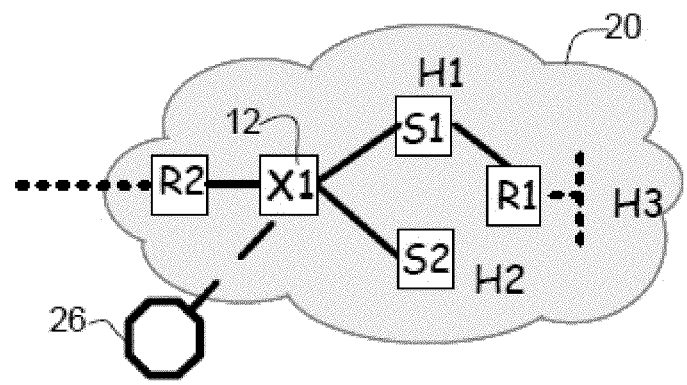

FIG. 4D illustrates an edge device X1 one-hop from border router R2, which is on path to edge. This case is a typical configuration when two routers are connected together via a switched network. In this case there are also hosts H1, H2 on the switched network. The OTV edge device X1 is in the data path so it hears all packets that are going from hosts H1, H2, H3 to exit router R2, host to host within the site, and router R1 to exit router R2. In this example, the edge device X1 can prefer intra-VPN traffic to take the overlay path versus the outside more public path.

Figure 4E:
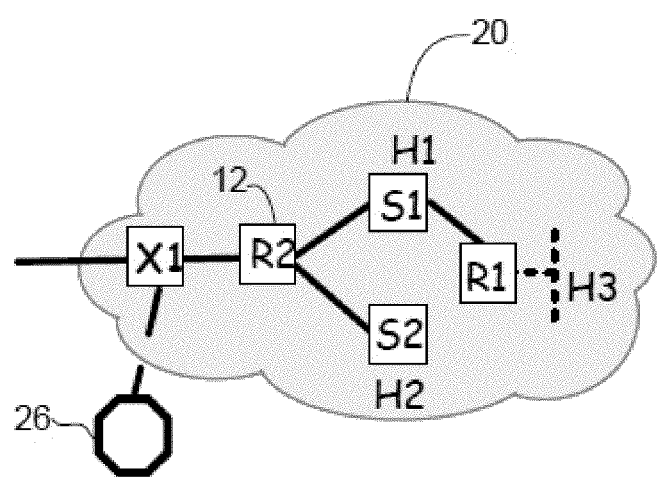

FIG. 4E illustrates an edge device X1 that is a border device with router R2 one hop away. In this configuration, exit router R2 can be connected to either a L2 or L3 core infrastructure with the edge device X1 in the data path. The only MAC address that the site 20 will advertise is the MAC address of the exit router R2.

Figure 5A:
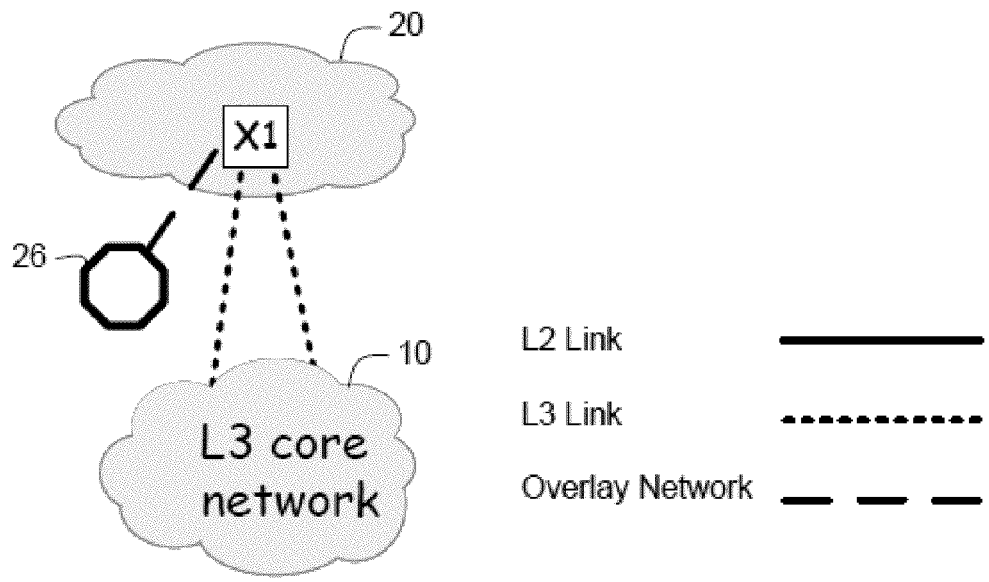
FIGS. 5A-5D illustrate different examples of redundant network designs in which the embodiments described herein may be implemented.
Figure 5B:
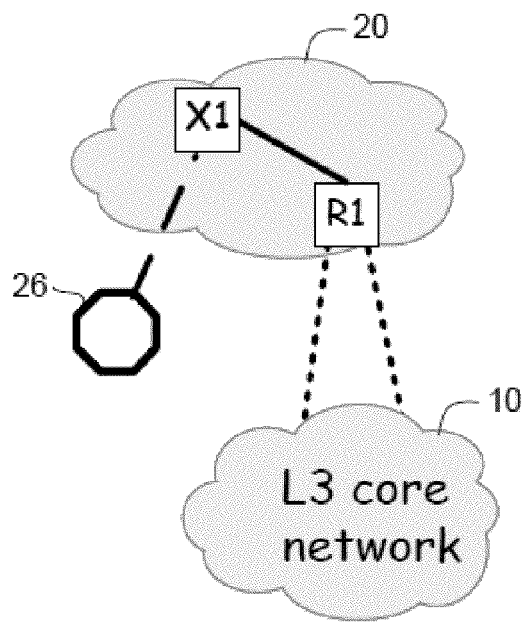
Figure 5C:
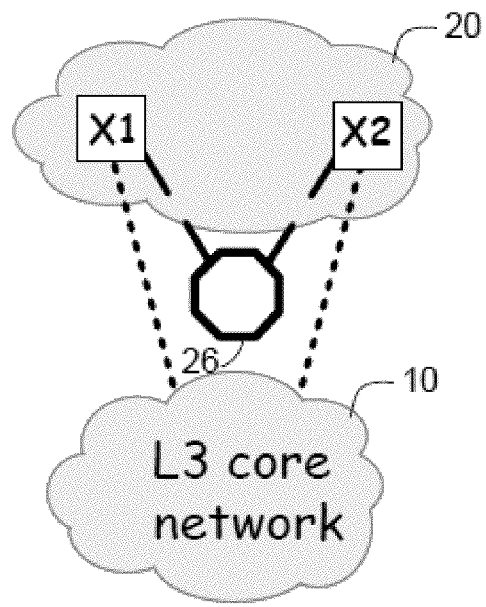
Figure 5D:
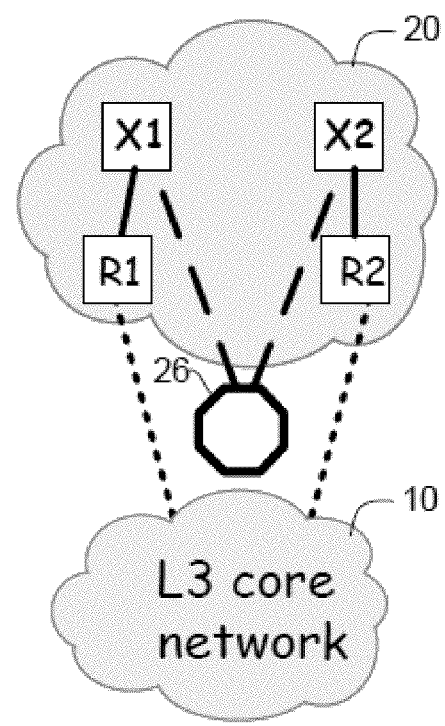

FIGS. 5A-5D illustrate various redundant network configurations. In each example, network site 20 includes one or more edge devices X1, X2 and routers R1, R2. FIG. 5A illustrates an edge device X1 with multiple external connections. In FIG. 5B a border router R1 has multiple external connections and edge device X1 has an L2 link to the border router. In FIG. 5C, the network includes multiple edge devices X1, X2, each with an external and overlay connection. The network shown in FIG. 5D includes multiple border routers R1, R2, each with external connections. Each edge device X1, X2 has a L2 link to each border router R1, R2, respectively, and a link to the overlay network 26.

It is to be understood that the network configurations shown in FIGS. 4A-4E and 5A-5D and described above are only examples and that an edge device configured for OTV may be used in other networks having different configurations and devices.

Overlay Transport Virtualization Process and Examples

Figure 6A:
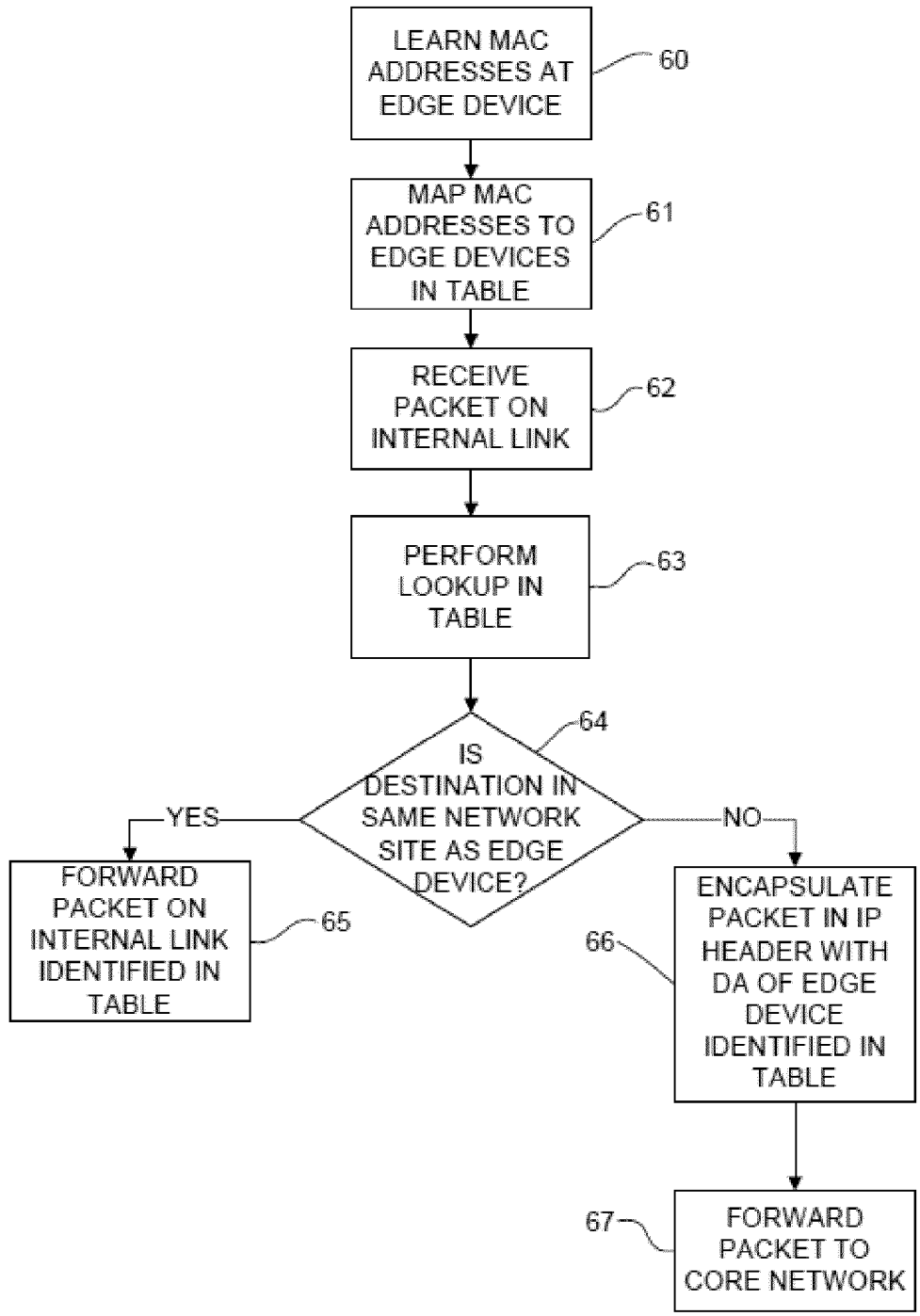
FIG. 6A is a flowchart illustrating a process for overlay transport virtualization in which packets are forwarded onto an overlay network, in accordance with one embodiment.

FIG. 6A is a flowchart illustrating an example of the OTV process for packets received at the network device 12 from an internal link. At step 60, a first edge device 12 located within a first network site 20 receives MAC addresses for network devices (e.g., hosts) in one or more other network sites (e.g., second network site 22) within its VPN (FIGS. 1 and 6A). The edge device 12 maps each of the MAC addresses to an address of an edge device located in the network site of the other network device (step 61). The addresses are mapped in a table which also contains address information (learned either in the data-plane in the case of an L2 edge device, or in the cIGP in the case of an L3 edge device) for network devices in the same network site as the first edge device. At step 62, the first edge device 12 receives a Layer 2 packet from one of the network devices located at the same network site as the first edge device. The edge device 12 performs a lookup in table 30 for a link corresponding to the MAC destination address in the packet (step 63). If the destination is in the same network site as the edge device, the edge device forwards the packet on an internal link identified in the table (steps 64 and 65). The decision as to whether the destination is in the same network site as the edge device is implicit in the lookup. If the lookup yields a normal next-hop, the destination is in the same network. If the lookup yields an encapsulation, the packet is in a different network. If the destination is in another network site, the packet is encapsulated with the IP header containing a destination address (DA) of the edge device identified in the table (steps 64 and 66). The encapsulated packet is then forwarded to the core network (step 67), where it is forwarded to the appropriate edge device.

Figure 6B:
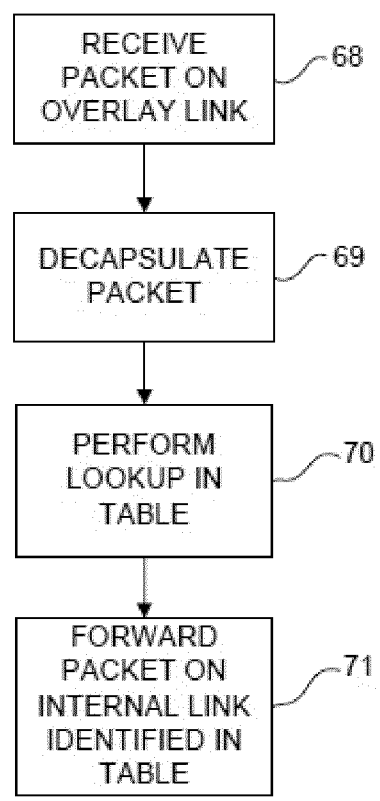
FIG. 6B is a flowchart illustrating a process for overlay transport virtualization in which packets are received from the overlay network, in accordance with one embodiment.

FIG. 6B illustrates a process wherein the packet received at the edge device 12 is from an overlay interface and destined for a network device within the same site as the edge device. At step 68, the edge device 12 receives a packet on overlay link 32 (FIGS. 2 and 6B). The packet is decapsulated at step 69. The MAC destination address is used to look up the internal link 34, 36 in table 30 (step 70). The packet is then forwarded onto the internal link identified in the table (step 71).

The following provides a number of examples describing unicast and multicast flow between L2 sites, L3 sites, and a combination of L2 and L3 sites. Broadcast packet flow, MAC mobility between network sites, and the partition and merging of network sites are also described. In the following examples the core network is an L3 network, however, it is to be understood that the core network may also be an L2 network, as previously discussed.

Unicast Packet Flow between Layer 2 Sites

Figure 7:
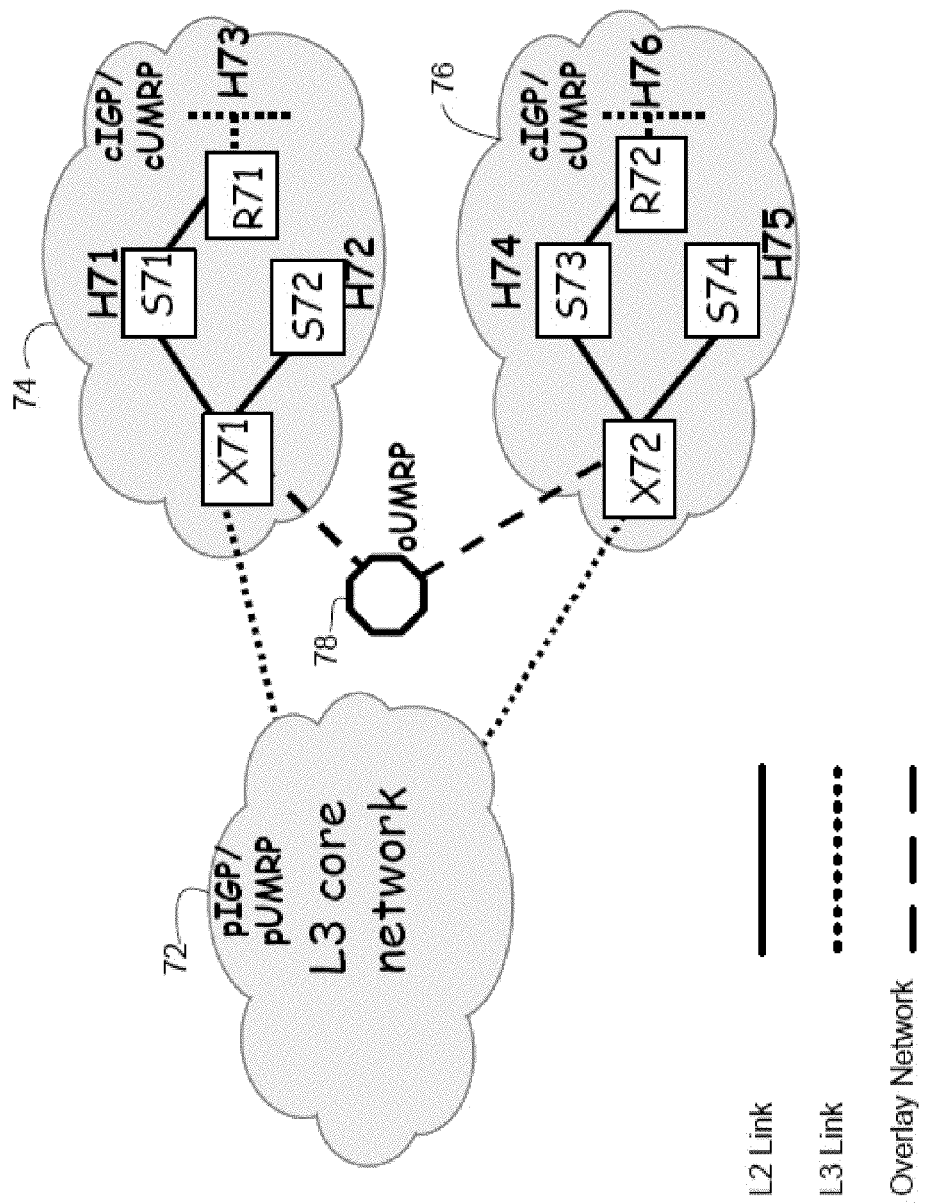
FIG. 7 illustrates an example of unicast packet flow between Layer 2 sites.

FIG. 7 illustrates unicast packet flow between two L2 sites. A Layer 2 site is one that is mostly made up of hosts and switches. Routers may exist but the majority of the topology to the edge devices are L2 switched. The number of MAC addresses advertised on the overlay network are all the hosts and routers connected to the L2 devices at the site.

The network shown in FIG. 7 illustrates any-to-any connectivity at the MAC level between any MAC devices. The network includes an L3 core network 72 in communication with two network sites 74, 76 having mostly L2 switches deployed. Network site 74 includes edge device X71, switches S71, S72, and router R71. Host 71 is connected to switch S71, host H72 is connected to switch S72 and host H73 is connected to router R71. Site 76 includes edge device X72, switches S73, S74, and router R72. Host H74 is connected to switch S73, H75 is connected to switch S74, and H76 is connected to router R72. The routers R71, R72 are connected to their respective hosts with an L3 link and the switches, routers, and edge devices are connected via L2 links. Since hosts H73 and H76 are supported by routers, their MAC addresses are not known to the switched network.

Overlay network 78 is shown connected to edge devices X71 and X72. The L3 core network 72 operates provider unicast/multicast routing protocol (pUMRP), the two customer networks 74, 76 run customer unicast/multicast routing protocols (cUMRP), and the overlay network 78 runs an overlay unicast routing protocol (oURP). As previously described, subnets and VLANs span across all sites. Each site has its own Spanning Tree and there is no L2 flooding or learning on the overlay network 78.

Before packet flow begins, edge devices X71 and X72 are configured with an IP multicast group address and IS-IS neighbor authentication key. The group address is allocated by the L3 core network 72 and is used to realize the control-plane component of the overlay network 78. The IS-IS neighbor authentication key allows for only intended edge devices to peer with each other. When IS-IS Hello packets are not accepted due to authentication failure, IS-IS adjacencies are not established and therefore no MAC routes are computed through the non-authenticated neighbor.

The following describes a packet flow sequence from host H71 in site 74 to host H74 in site 76 in the same VPN. Host H71 wants to send an IP packet to H74's IP address but does not know host H74's MAC address. H71 sends an ARP packet (broadcast MAC packet) which is forwarded by the switches (S71) in the source site 74 on the sites Spanning Tree. This causes all switches, including edge device X71 to learn about H71's MAC address. Edge device X71 encapsulates the broadcast packet into an IP multicast packet to be transmitted to all sites of the VPN. The edge device sends a single copy of the packet and allows the L3 core network 72 to replicate on its behalf. Edge device X71 advertises H71's MAC address in an IS-IS LSP since it has learned that H71 is local to its site. When edge device X72 receives the broadcast packet, it forwards the packet on the Spanning Tree for its site. This allows the packet to get to H74 so it can reply to the ARP request. When edge device X72 receives the IS-IS LSP from X71, it computes that the H71 MAC address is reachable through the IP address of X71. This is stored in the MAC table in edge device X72.

Host H74 replies to the ARP request by sending a unicast packet to H71's MAC address. The switches (S73, S74) in H74's site know where H71 is since they learned H71's address when they saw the broadcast ARP request packet on the Spanning Tree.

Switch S73 forwards H74's unicast packet destined for H71 to edge device X72. Edge device X72 receives the ARP reply packet and knows that H71 is reachable via the overlay network 78. Edge device X72 encapsulates the frame in an IP unicast packet addressed to edge device X71's IP address. The core network 72 delivers the packet to X71.

When edge device X71 receives the IP packet, it decapsulates the packet and finds that the H71 MAC address is the destination address in the frame header. Edge device X71 knows that host H71 is reachable via an internal link, so it forwards the frame out that link. Switch S71 receives the frame and forwards it directly to H71.

In the above example, if H73 sends packets to H76, R71 and R72's MAC address are used for forwarding through the L2 cloud across sites. Unicast Packet Flow between Layer 3 Sites A Layer 3 site is one that is mostly made up of routers connecting to hosts via switches. The majority of the topology to the edge devices are L3 routed. The number of MAC addresses advertised on the overlay network are limited to the router devices at the site. When a site runs as a L3 site, routers located in different OTV sites will look like they are adjacent to each other on the same subnet. Since an OTV edge device is a L2 device, all router protocol traffic and packets directed by the router to another router's MAC address for forwarding data packets, get switched by the edge device over the overlay network. In this case, there is one client IGP running across all sites within the same VPN.

Figure 8:
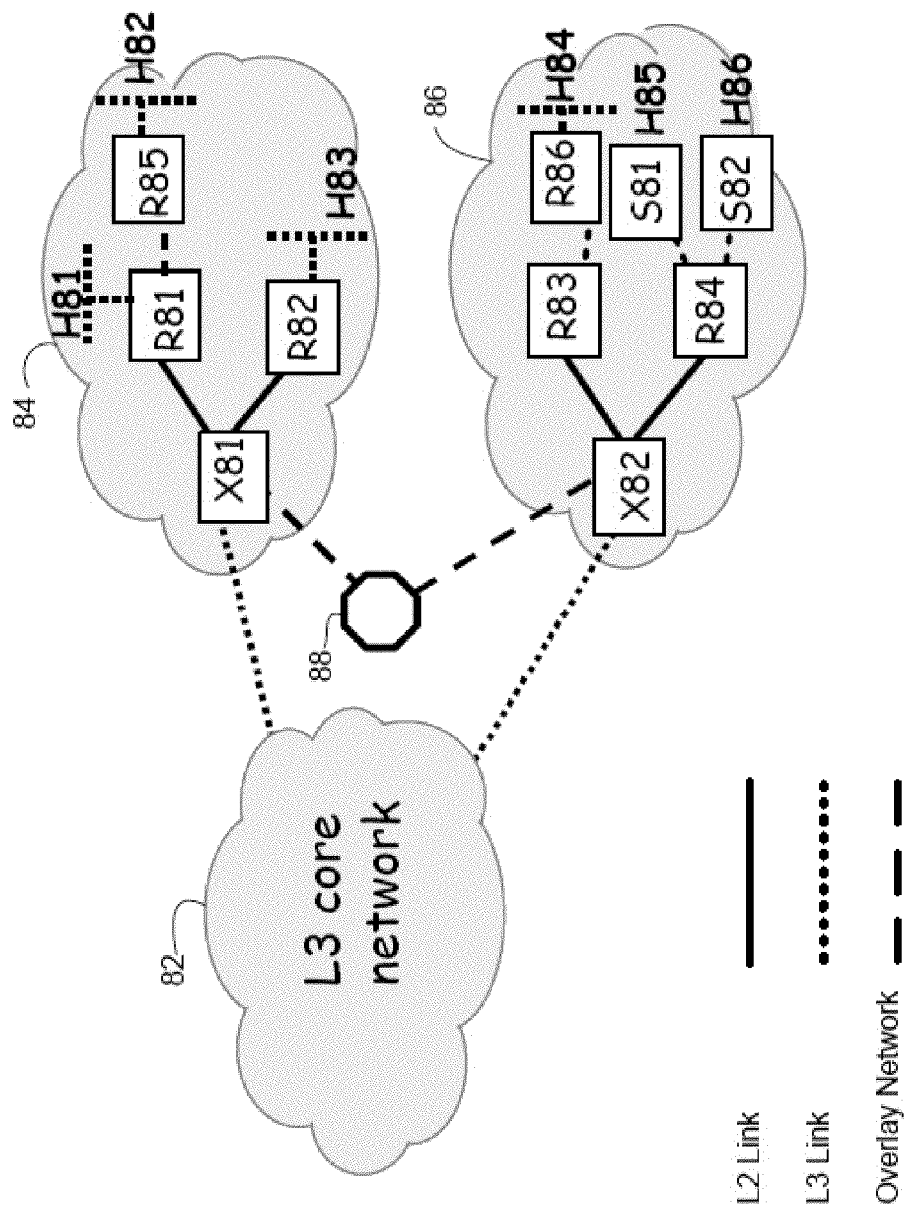
FIG. 8 illustrates an example of unicast packet flow between Layer 3 sites.

FIG. 8 illustrates unicast packet flow between two sites 84 which are predominately made up of routers and connected through a L3 core network 82. There are very few MAC addresses carried in the switched network and transported on the overlay network. The topology allows the routers to look adjacent, as if they were on the same physical subnet. Site 84 includes edge device X81, routers R81, R82, and R85 and hosts H81, H82, and H83. Site 86 includes edge device X82, routers R83, R84, R86, switches S81, S82, and hosts H84, H85, and H86. All routers run a customer routing protocol (cIGP) to learn about all subnets inside the IGP domain. Routers R81, R82, R83, and R84 are configured on the same subnet and packet reception is realized by the inter-site switched network.

The following describes a packet flow sequence from host H81 in site 84 to host H84 in site 86. Host H81 first sends a packet to H84's IP address. H81 knows H84's address is off the subnet, so it sends the packet to its default router, which is router R81. The packet from host H81 is therefore MAC addressed to router R81. Router R81 knows via the cIGP that the next hop to reach the subnet of host H84 is via router R83. It sends the packet encapsulated with R83's MAC address as the destination address in the frame.

Edge device X81 receives the frame and based on previous packets sent from R83 (the routing protocol was sending and receiving packets to and from this MAC address), edge 20 device X81 knows the next-hop for R83's MAC address is via X82's IP address through the overlay network 88. The core network 82 delivers the packet to X82 where it is decapsulated and sent on the X82-R83 link via MAC learning from a previous packet sent with R83's MAC address. Router R83 routes the packet to router R86 which forwards to host H84 via normal routing which is unaffected by the edge device or overlay network.

Multicast Packet Flow Between Layer 2 Sites

In one embodiment, an ASM/Bidir multicast group is provided for each VPN the edge device supports. An (S, G) route in the core uses G as the data group used at the site, with S being the edge device. The edge device encapsulates a client multicast packet in a core-deliverable multicast packet. In one embodiment, joining either ASM/Bidir or SSM (Source Specific Multicast) groups is done using IGMPv3/MLDv2 in the edge devices.

Figure 9:
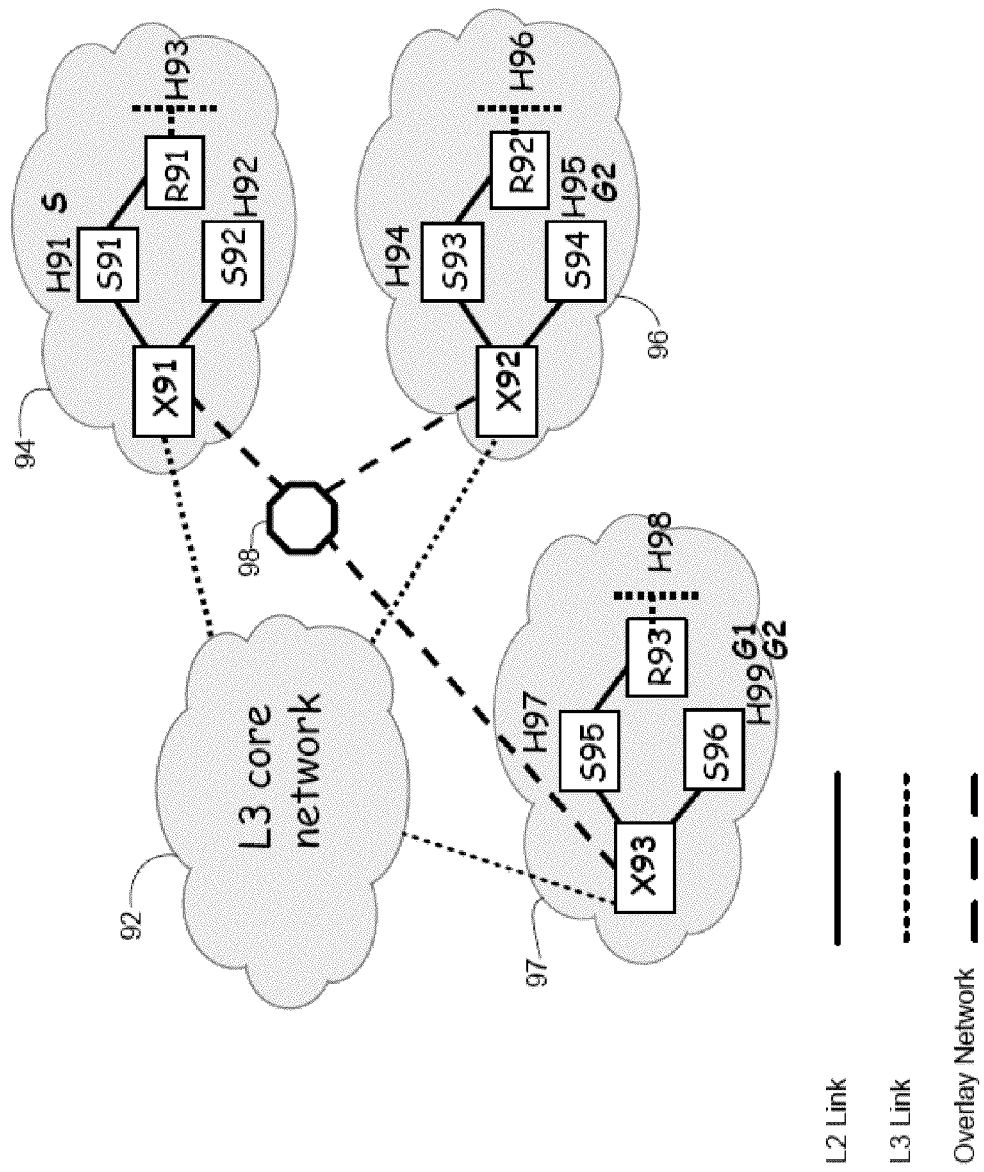
FIG. 9 illustrates an example of multicast packet flow between Layer 2 sites.

FIG. 9 illustrates multicast packet flow between L2 sites in a VPN. The network includes an L3 core network 92 in communication with three L2 sites 94, 96, 97. An overlay network 98 connects edge devices X91, X92, X93, at sites 94, 96, 97, respectively. Site 94 also includes switches S91, S92, connected to hosts H91 and H92, respectively, and router R91 supporting host H93. Site 96 includes switches S93 and S94, connected to hosts H94 and H95, respectively, and router R92 connected to host H96. Site 97 includes switches S95 and S96 connected to hosts H97 and H99, respectively, and router R93 coupled to host H98. The routers are connected to their respective hosts through L3 links. The switches and routers are connected via L2 links. The edge devices are connected to the L3 core network via L3 links. The sites support IGMP/MLD-snooping, however, IGMP/MLD snooping and head-end replication are not performed over the overlay network 98. Packets go only to sites with group members.

The following describes a multicast source S (host H91) at network site 94 sending data to two different multicast groups G1 and G2. G1 members are only in site 97 and G2 members are in both sites 96 and 97.

Host H99 first sends an IGMP/MLD report for the two multicast groups it wants to join (G1 and G2) and host H95 sends an IGMP/MLD report for G2. Switch S96 (an IGMP/MLD snooping switch) forwards the IGMP/MLD report from H99 to router ports and querier ports. Edge device X93 hears the IGMP/MLD reports and does not forward them on the overlay network 98, since STP and IGMP/MLD-snooping packets do not occur in the overlay network. Edge device X93 advertises the G1 and G1-MAC in its GM-LSP so that edge devices X91 and X92 can learn what groups are active in the overlay network 98. If the edge device in a multicast source site knows the IP group address being joined by a remote site, it can avoid forwarding packets for another group which maps to the same MAC address.

Edge device X93 sends an IGMPv3/MLDv2 (X1, G1) and (X2, G2) report onto its core link so that multicast data is not encapsulated with the same group address as the IS-IS messages. The core network 92 builds SSM trees for group G1. If a source in X91 or X92's site starts sending, packets go only to X93's site. There is no coordination of group addressing required between the edge devices and the core because the (S, G) is unique as long as the source S is unique. The source S is unique due to the address allocation configured in the edge devices. In this case, S is the edge device's IP address and G is used in the cMRP as well as the pMRP.

Source H91 now sends a packet to group G1. Switch S91 sends a packet on router ports which X91 will be transit for. Edge device X91 learns host H91's MAC address on the X91-S91 link. X91 determines that the packet is being sent to group G1 and notices that it has a MAC entry, learned via IS-IS for group G1. The interface in the oif-list for the entry is the overlay network 98. Therefore, edge device X91 will encapsulate the packet in an IP multicast packet where the source address is X91 and the destination address is the same as the address the source sent the packet to (group G1).

Edge device X91 then sends the packet on the link into the core network 92. The core network 92 forwards the multicast packet based on (X91, G1) which gets the packet to site 97 with the single receiver. When source S sends to group G2, the 15 same procedure is used except edge device X91 encapsulates the packet as (X91, G2).

The core network 92 will then deliver the packet on the SSM-based multicast tree for (X91, G2), which delivers the packet to both sites 96, 97 (where receivers exist in both sites). The amount of state that is created in the core network 92 is based on the number of groups the VPN joins times the number of authoritative edge devices in all sites of a VPN. An optimization may be implemented to create SSM trees only to the sites where there are active sources. To achieve this, edge devices advertise in IS-IS (S, G) pairs which identify an active source S sending to group G. Then, when a receiver site sends IGMP/MLD joins for a group G, it does so only for the active sites sourcing to group G.

In one embodiment, rather than advertising the source address, the groups which are being sourced can be identified. This allows receiver sites to build SSM trees to only the source sites.

Also, the source site can be determined even when (S, G) pairs for active sources are not advertised, but when a receiver site IGMP/MLD joins an (S, G) pair. However, the source's IP route would have to be known by the edge device. The edge device does not have this information if it stores only unicast MAC addresses, multicast MAC addresses, and IP group addresses. When an edge device is co-located with an IP router, this information is known locally from the IP routing table maintained in the edge device for the cIGP. This optimization may also be used to reduce multicast state in the core network.

Multicast Packet Flow Between Layer 3 Sites

Figure 10:
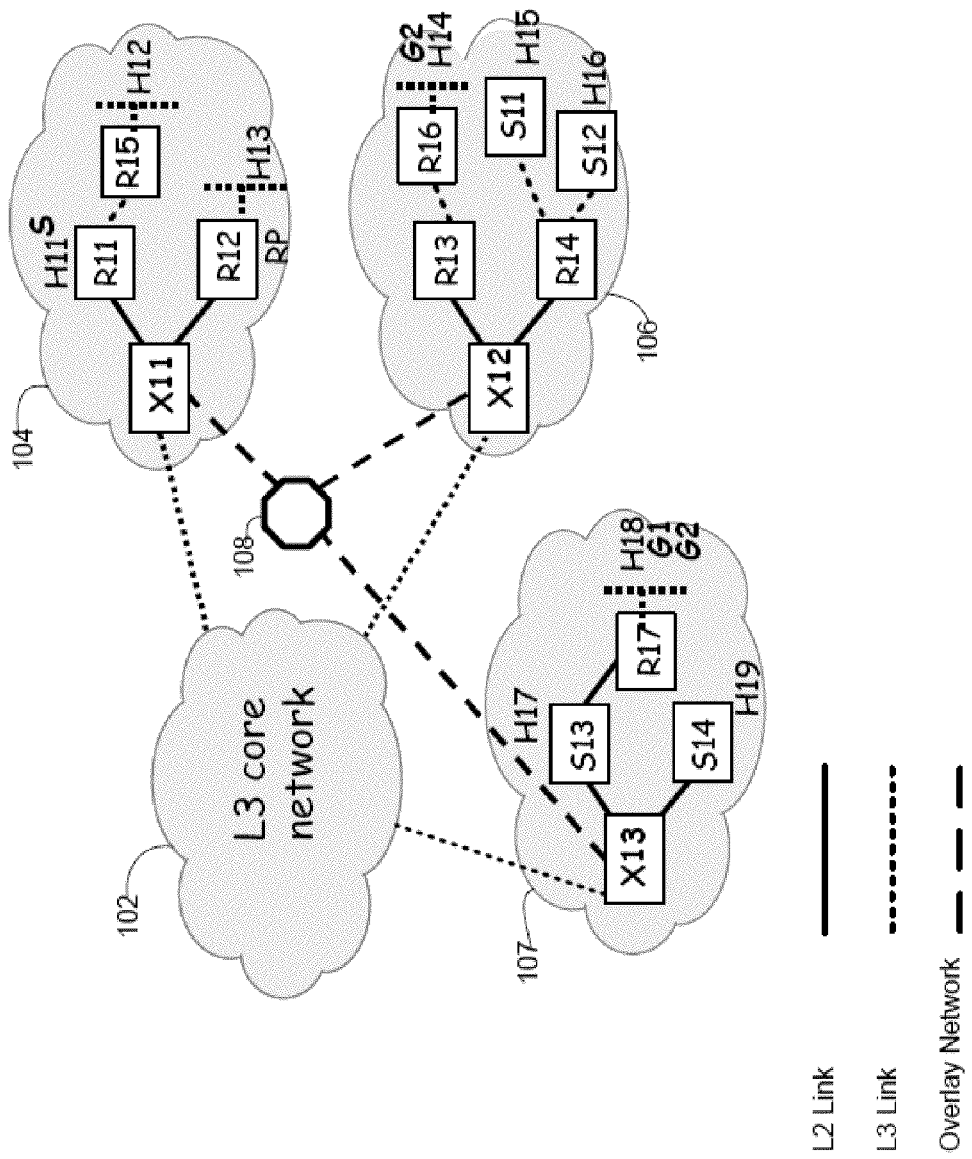
FIG. 10 illustrates an example of multicast packet flow between Layer 3 sites.

FIG. 10 illustrates multicast packet flow between L3 sites. As described below, the L3 sites run PIM across the L2 overlay network. An L3 core network 102 is in communication with three L3 sites 104, 106, 107. Site 104 includes edge device X11, routers R11, R12, R15, and hosts H12 and H13. Site 106 includes edge device X12, routers R13, R14, R16, switches S11, S12, and hosts H14, H15, and H16. Site 107 includes edge device X13, switches S13, S14, router R17, and hosts H17, H18, and H19. Routers R11, R12, R13, R14, and R17 and hosts H17 and H19 look adjacent to each other on the same common subnet. These five routers IGP and PIM peer with each other. If hosts H17 and H19 join groups, they are treated like directly connected receivers and if they send multicast packets, they are treated as directly connected sources. The routers IGP and PIM peer with each other. If the hosts join groups they are treated like directly connected receivers and if the hosts send multicast packets they are treated as directly connected sources.

The following example starts with host H18 joining groups G1 and G2 in site 107 and host H14 joining group G2 in site 106. The Rendezvous Point (RP) is placed at router R12 and the source is at host H11 at site 104. Host H18 sends IGMP/MLD reports for groups G1 and G2. Router R17 is the PIM designated router (DR) on the host H18 subnet. Router R17 therefore sends a (*, G1) and (*, G2) PIM join-prune message to the next-hop router toward the RP. Unicast routing will identify this as R12 (which happens 15 to be the RP in this example, but does not need to be).

Edge device X13 then performs PIM-snooping at the site, but not on the overlay network 108. X13 takes the (*, G1) and (*, G2) routes from the PIM join-prune packet and sends an IGMPv3/MLDv2 (X11, G1) and (X11, G2) into the core. In this case, different than the IGMP/MLD-snooping case, the edge device knows where the PIM join-prune message is going, so it does not have to IGMPv3/MLDv2 join to all edge devices. Edge device X13 translates the upstream router address in the PIM join-prune message into a MAC address, and then does a MAC address lookup to see who has advertised it. In this example, router R12's MAC address is being advertised by edge device X11, so edge device X13 can IGMP/MLD join (X11, G1) and (X11, G2).

When a source from X12's site 106 sends a packet, edge device X13 can later join those SSM entries. Edge device X13 also advertises G1, G1-MAC, G2, and G2-MAC in its GMLSP. When router R12 receives the PIM join-prune message, it places the link to router R17 (R12-X11 link) in its L3 oif-list. This is the first oif that is on the shared-tree for both entries (*, G1) and (*, G2).

Source H11 now sends a multicast packet to group G1. Router R11 is the PIM 10 DR for the subnet so it will PIM register encapsulate the packet to router R12. R12 will decapsulate the packet and forward it down the shared tree, in this example, out the X11-R12 link. Edge device X11 knows that G1-MAC is in the oif-list for the MAC table entry since edge device X13 advertised it in its GM-LSP, so it will encapsulate the packet with addresses (X11, G1) which the core is ready with a SSM-based tree already built.

For the G2 case, edge device X11 encapsulates in (X11, G2) and the core delivers the packet to both sites 106, 107. The shared-tree has now been built and the first packets have traveled on the shared-tree. The following describes how the source tree is setup. Once router R17 receives a packet on the (*, G1) shared-tree from source host H11, router R17 joins the source-tree.

In this example, router R17 sends an (H11, G1) PIM join-prune message. The message is sent to router R11 since it is on the shortest path to the source H11. Edge device X13 then again PIM snoops on the PIM join-prune message and interrogates the upstream router address and realizes the next-hop router R11's MAC is via X11's IP address. Since it has already IGMP/MLD joined an (X11, G1) for the site's (*, G1) entry, it won't have to for the site's (H11, G1) entry. So in this case, both entries (H11, G1) and (*, G1) can share the same SSM-based state in the core.

Router R17 prunes (H1, G1) off the shared-tree but the edge device X13 knows there are source trees using (X11, G1) so it will not IGMP/MLD leave (X11, G1) until all source tress are left at the PIM level.

Multicast Packet Flow in a Hybrid VPN

Figure 11:
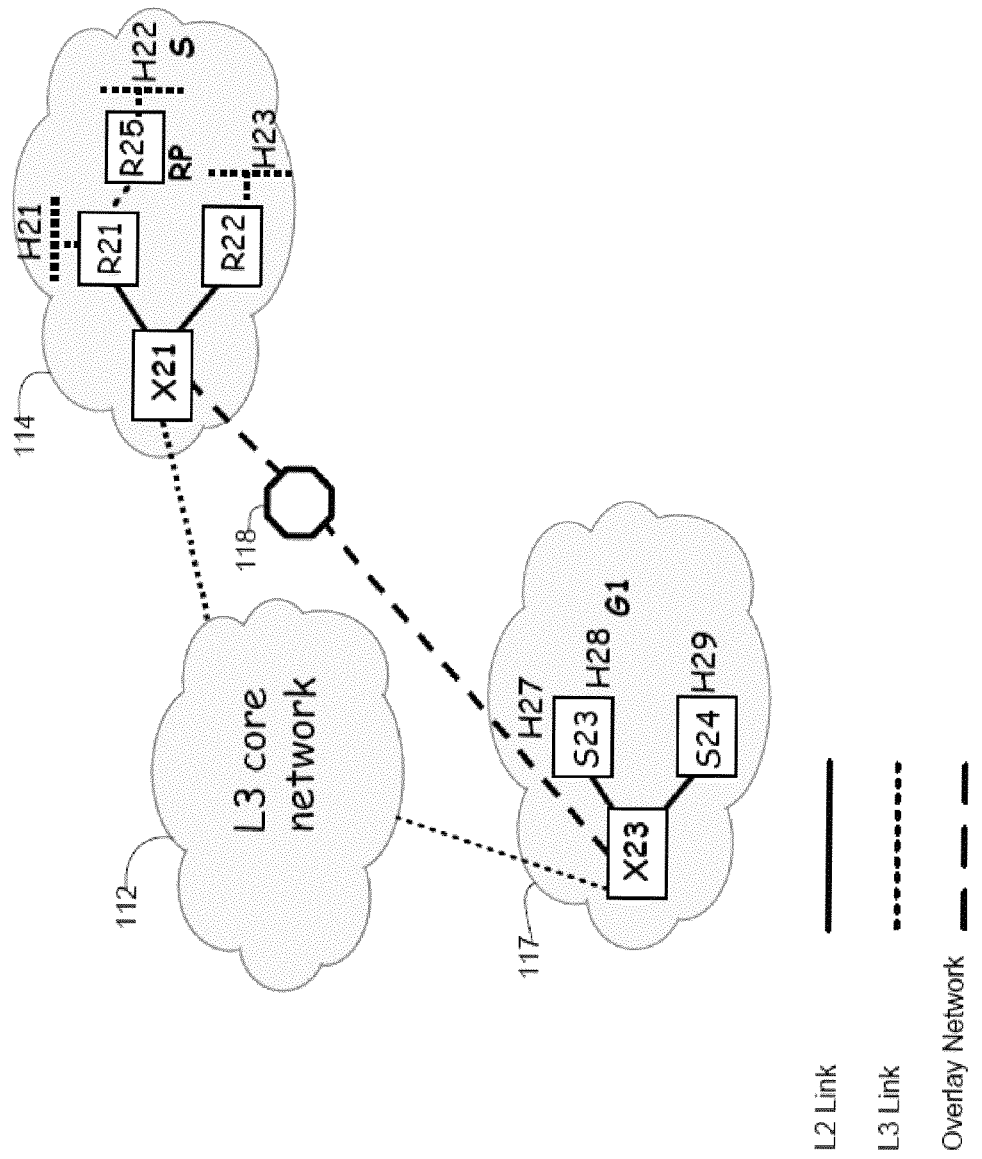
FIG. 11 illustrates an example of multicast packet flow in a hybrid VPN.

FIG. 11 illustrates a hybrid VPN comprising L2 site 117 and L3 site 114 connected by core network 112. Site 114 includes edge device X21, routers R21, R22, and R25, and hosts H22, H23. Site 117 includes edge device X23, switches S23, S24, and hosts H28, H29.

Translation is performed to and from IGMP-snooping and IS-IS GM-LSP advertisement. For example, if host H28 in L2 site 117 joins group G1, IGMP-snooping is performed along all switches. However, the IGMP report is not sent on the overlay network 118 by edge device X23. Edge device X21 learns about group G1 from IS-IS, but routers R21 and R22 need to know the group address so they can join the shared-tree in the source domain. Edge device X21 therefore needs to originate IGMP reports that it learns from its GM-LSP. Since the GM-LSP contains both an IP group address and a MAC group address, the edge device has all the necessary information to generate an IGMP report.

If host H28 is a source in the L2 site 117 and host H22 a group member in the L3 site 114, the IGMP-snooping logic in the L2 site would forward all data to router ports so that the edge device X23 will see such packets. Edge device X23 knows which groups to forward packets based on the GM-LSP advertisement originated by edge device X21.

Broadcast Packet Flow

A broadcast packet originated at an OTV site needs to be delivered to all sites of the same VPN. In one embodiment, this is accomplished with ASM/Bidir group encapsulation. This is the same group used by IS-IS for the oUMRP.

A broadcast packet sourced in a site, gets to all edge devices because each edge device is on the spanning tree. In order to avoid duplicates in the overlay network when there are multiple edge devices, the authoritative edge device for the VLAN is the only edge device that forwards the packet on the overlay network. The authoritative edge device prevents duplicate packets from going into the site because it is the only edge device forwarding the packet into the site. Once sent into the site, the packet gets to all switches on the site specific Spanning Tree.

Since only the authoritative edge device can forward the broadcast packet in or out of the site, broadcast loops are avoided as any non-authoritative edge device receiving a broadcast packet on its internal interface will not forward the broadcast packet onto the overlay network.

OTV may reduce the amount of broadcast traffic on the overlay network. For example, the OTV device 12 can snoop on ARP requests and cache the IP address to MAC mapping. If other hosts ARP for the same foreign IP address, the OTV device can ARP reply locally rather than send the broadcast traffic over the overlay network.

Alternatively, the OTV device 12 can put IP_address-to-MAC_address pairs in the oUMRP. The edge device 12 can then respond when an ARP request arrives for an IP address in the link state database. In this case, no ARP packets are sent over the overlay network.

MAC Mobility

In order to support server virtualization in Data Center networks, applications migrate from one physical server to another very quickly. Along with the application migration, the MAC address associated with the application also migrates. Since there is a single authoritative edge device for all traffic within a VLAN and IS-IS is explicitly advertising remote MAC addresses, the edge device knows when the MAC is remote and when it is no longer remote. If an authoritative edge device has a MAC address stored in the MAC forwarding table which points to the overlay interface, it means that an edge device in another site has explicitly advertised the MAC as being local to its site.

Therefore, any packets coming from the MAC address will be coming from the overlay network. Once the MAC address is heard on an internal interface, it has moved into the site. Since it has moved into a new site, the authoritative edge device in the new site is responsible for advertising it in its LSP.

It is the authoritative edge device in the site the MAC address has moved to that knows immediately that it has moved from arrival of a data packet from the MAC address on an internal interface. The authoritative edge device in the site the MAC has moved from does not know the move happened and still has the MAC address in its MAC table pointing to an internal interface. The authoritative edge device in the site from which the MAC address has moved from, may find out that the MAC is no longer in its site from in a number of different ways. For example, the authoritative edge device can hear packets from the MAC address coming from the overlay network or it can be told via IS-IS. The second method is preferred because if there is no traffic coming from the moved MAC address to the site it moved from, no corrective action would be taken, and other remote sites will still think the MAC is in the old site.

Figure 12:
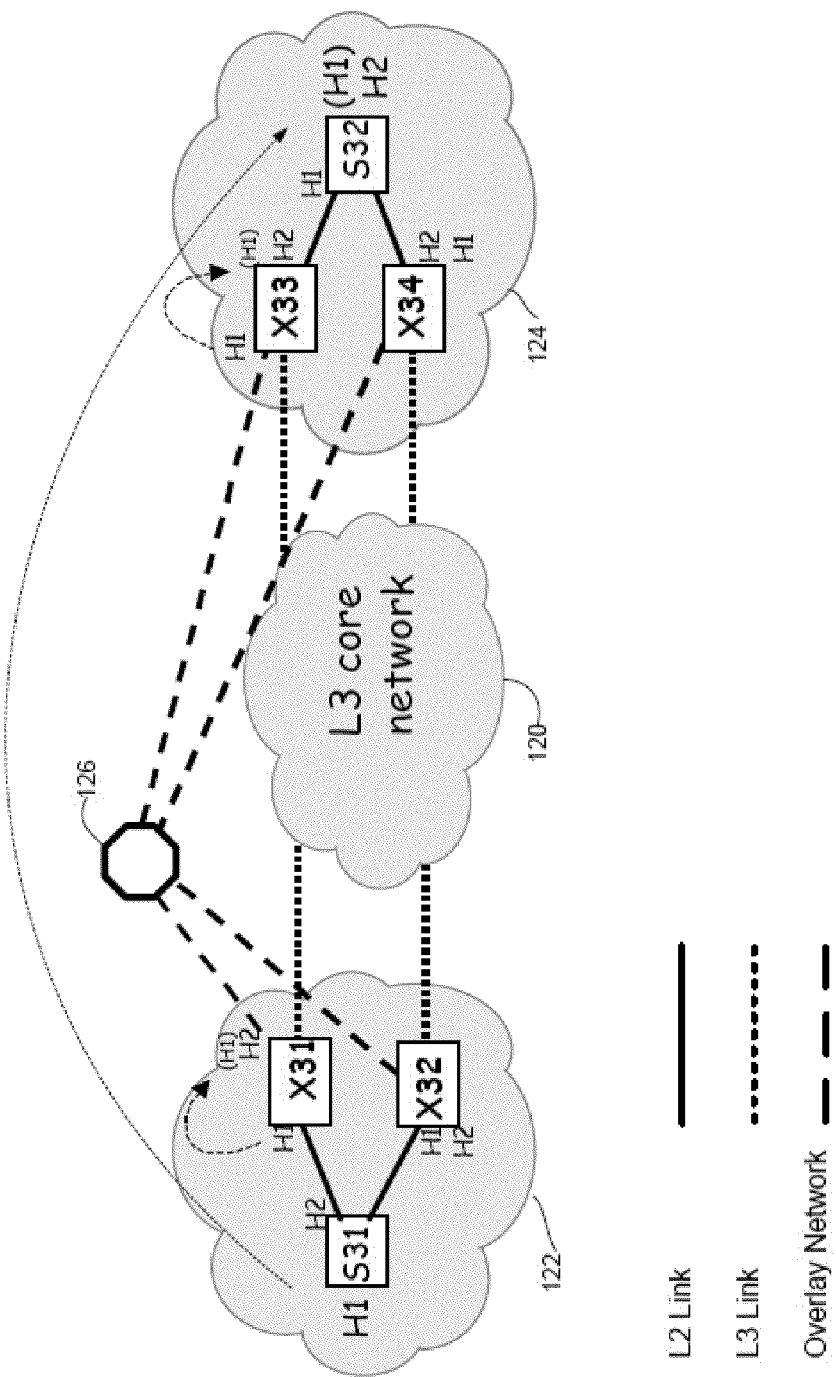
FIG. 12 illustrates an example of MAC mobility.

FIG. 12 illustrates a MAC mobility example in which H1 MAC moves from switch S31 in network site 122 to switch S32 in network site 124. The sites are connected by L3 core network 120 and overlay network 126. Site 122 includes edge devices X31 and X32 and site 124 includes edge devices X33 and X34. When host H1 20 and H2 have been chatting, the state in the MAC tables appear as shown by the hosts listed at each interface in FIG. 12. Changes following the H1 MAC move are shown in italics and indicated with dashed arrow lines. In a redundant edge device configuration, local MACs are advertised with best-cost by one edge device so there is one way in and out of a site. Support is active-backup for MACs within a VLAN but active-active across VLANS. When H1 moves, edge device X33 detects the move since it hears packets on its X33-S32 link. Edge device X33 changes the MAC table for the H1 MAC and advertises H1 in IS-IS. Edge device X31 sees H1 MAC advertisement from X33 and withdraws advertising H1 MAC from its LSP. Site 122 as well as other sites now know H1 is reachable via edge device X33.

Site Partition/Merging

When a site has two or more edge devices connecting the site to the overlay network, a site can be partitioned but still connected to the overlay network and can be reachable as two independent entities to remote sites in the VPN. When this happens, each edge device loses its internal site peering adjacency with the other. Each site elects a new site-id and the side-id is advertised in IS-IS Hello messages on the overlay network. At the same time, if this site had exactly two edge devices, each would become authoritative for the entire VLAN-ID range. This means that there will be new MACs that need advertising from both partitioned edge devices. When the site partitions, the MAC table is preferably cleared and an STP topology change notification sent, if STP is running at the site, so that unicast and multicast MAC addresses can be relearned and advertised into IS-IS. Also, since the site partitioned, there will be two independent Spanning Trees built, one for each site.

Sites may merge, for example, when a link is inadvertently connected to two switches or routers that are intentionally configured to be in different sites. Also, sites may merge during a rehealing after a partition, as previously described. In the case where the two sites are L2 sites, two individual Spanning Trees become one with one new root bridge is elected. All OTV edge devices will notice each other and there will be new authoritative edge device election for each VLAN-ID range. When an edge device was authoritative and becomes non-authoritative, it needs to remove all MAC entries that point out the overlay network from its MAC table and withdraw all unicast and multicast MAC advertisements from its LSPs.

Figure 13:
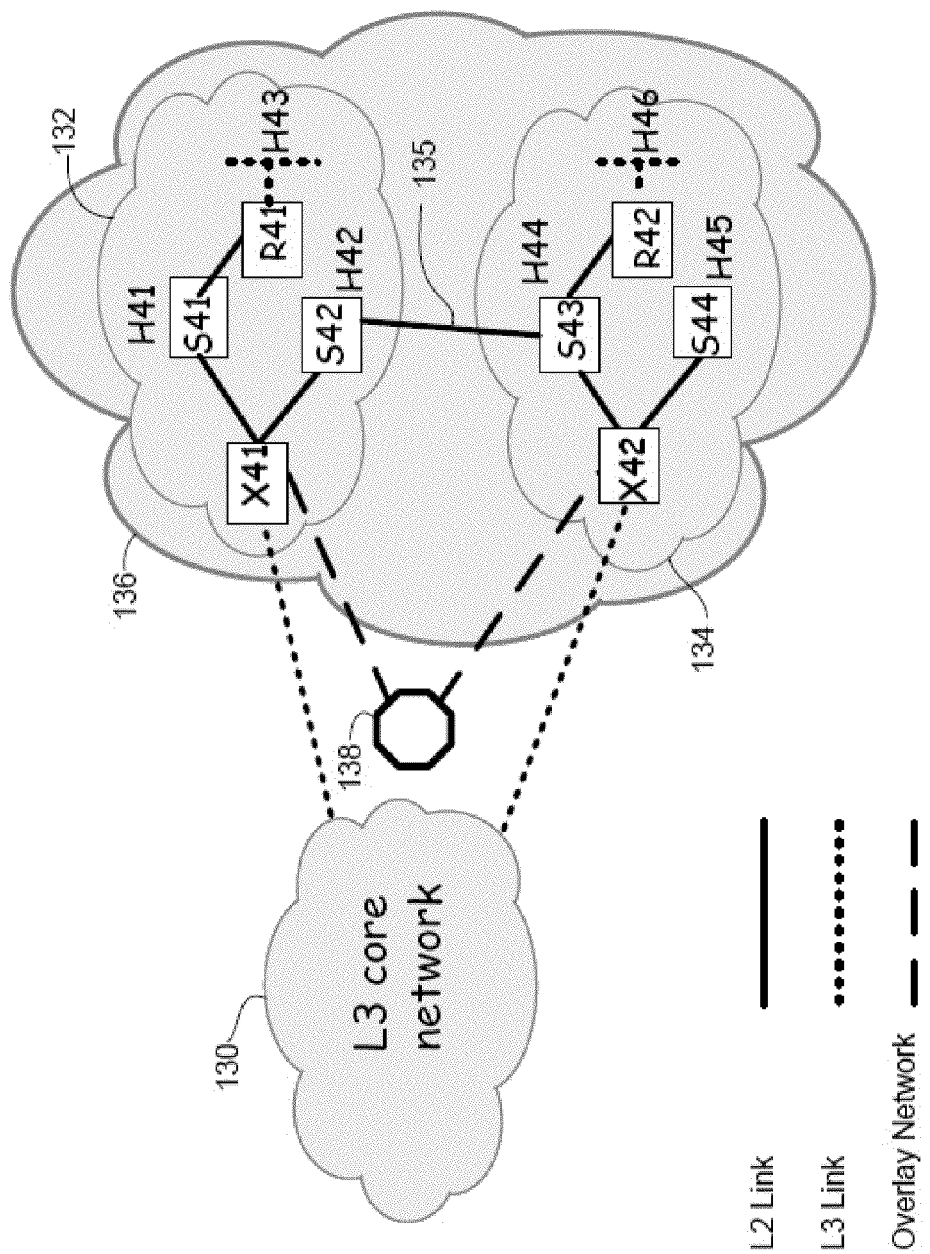
FIG. 13 illustrates an example of a network merge.

FIG. 13 illustrates merging of two L2 sites 132 and 134 into network site 136. Site 132 includes edge device X41, switches S41 and S42, router R41, and hosts H41, H42, and H43. Site 134 includes edge device X42, switches S43 and S44, router R42, and hosts H44, H45, and H46. When the sites merge at L2 by connecting link 135, two single-home sites become one multi-homed site and two separate Spanning Trees become one. In this example, edge devices X41 and X42 IS-IS peer with each other over both the overlay network 138 and the internal switched network. On the internal peering, they elect a site-id, which is the system-id of the highest priority edge device. Both advertise the site-id on the overlay peering link so they, as well as other edge devices in the VPN, detect they are at the same site.

Load Balancing and ECMP

Figure 14:
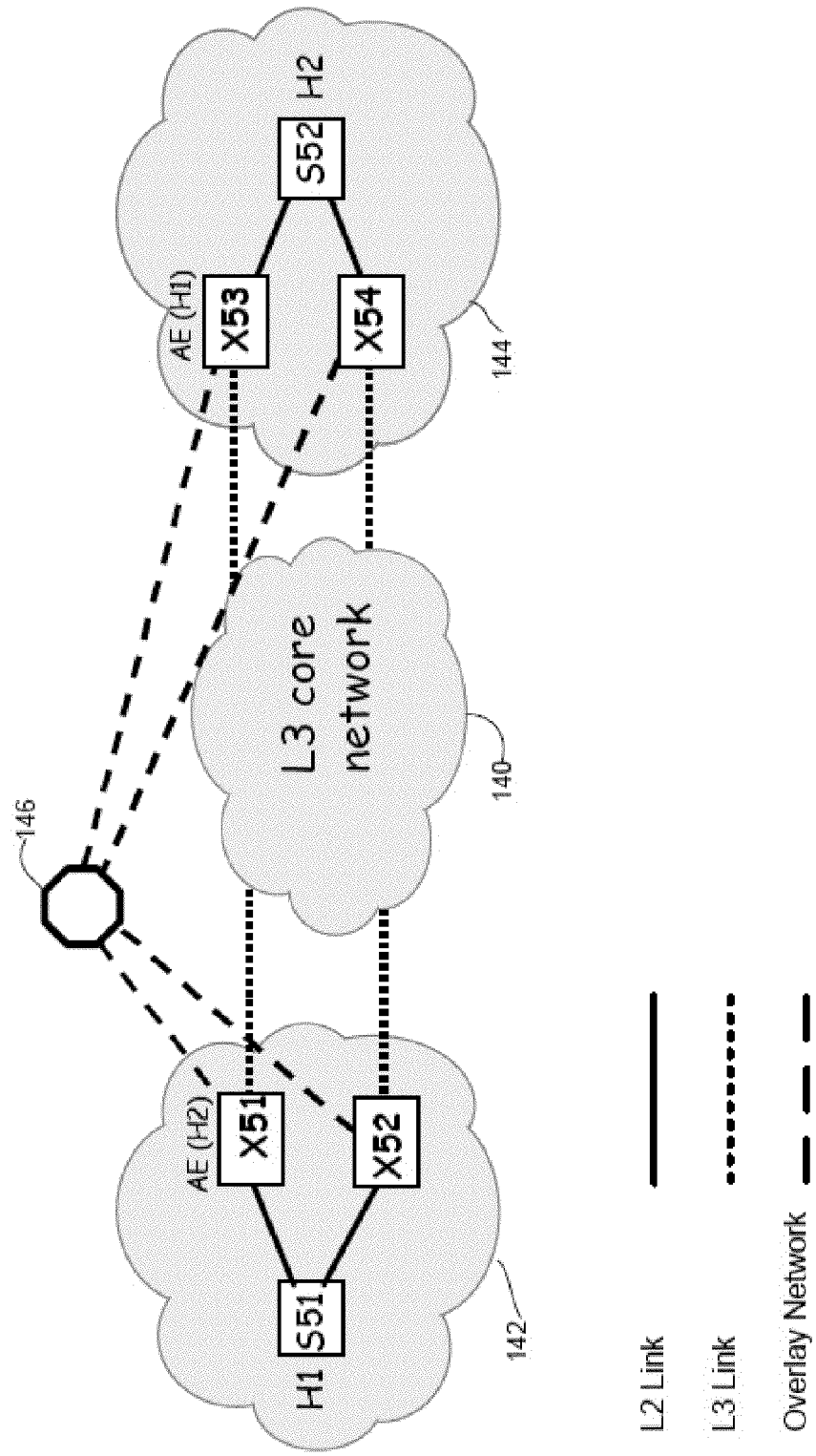
FIG. 14 illustrates a unicast hash example for use in multi-homing.

The following describes an example for load balancing and ECMP (Equal Cost Multipath) across a VLAN. This can be used to provide optimal multi-homing for OTV sites. FIG. 14 illustrates an example of a network comprising two sites 142, 144 connected by core network 140 and overlay network 146. Site 142 includes edge devices X51 and X52 and switch S51 (H1). Site 144 includes edge devices X53 and X54 and switch S52 (H2). In this example, edge device X51 is an authoritative edge (AE) device for forwarding traffic from H1 to H2 and receiving traffic from H2 destined for H1. Edge device X53 is an authoritative edge device for receiving traffic from H1 destined for H2 and forwarding traffic from H2 to H1. Determination of the edge device is described below.

The authoritative edge device handles all traffic for a given remote MAC address. A non-authoritative edge device is any edge device that is not the authoritative edge device for a given MAC address. The authoritative edge device is determined using a hash algorithm based on remote MAC address and local ordinals. Each edge device has an ordinal assigned thereto. Unicast forwarding involves the choice of a local egress device and a remote ingress device. The local egress device is determined based on a destination address (DA) hash. The remote ingress device is determined locally based on a source address (SA) hash.

Referring again to FIG. 14, the following describes symmetric hash decisions for a unicast hash example. Calculations are first performed at site 142 to determine the local (site 142) egress authoritative edge device and the remote (site 144) ingress authoritative edge device for use in forwarding data from H1 (source address (SA)) to H2 (destination address (DA)). In order to determine the local egress device, a local hash function (f) is performed on the destination address (MAC address for H2 at the remote site) and local ordinal (LO) for site 142 (O1), as follows: AE(H2)H1→H2=f(DA,LO)=f(H2,O1)=X51

The remote ingress device is identified by performing a remote hash function (f) on the source address (MAC address for H1 at the local site) and remote ordinal (RO) for site 144 (O2), as follows: AE(H1)H1→H2=f(SA,RO)=f(H1,O2)=X53

The following calculations are performed at site 144 to determine the local egress device and remote ingress device for use in forwarding data from H2 (source address (SA)) to H1 (destination address (DA)). A local hash function (f) is performed on the destination address (MAC address for H1 at the remote site) and local ordinal for site 144 (O2), as follows: AE(H1) H2→H1=f(DA,LO)=f(H1,O2)=X53

The remote ingress device is identified by performing a remote hash on the source address using a remote ordinal for site 144, as follows: AE(H2) H2→H1=f(SA,RO)=f(H2,O1)=X51 The remote MAC address (DA) may be learned by data or control plane learning. The local ordinals are elected and known locally. The local MAC address (SA) is learned by conventional bridging. The remote ordinals are remotely defined parameters which are obtained using control plane learning. All edge devices in a site advertise local MAC addresses to the overlay to enable ECMP forwarding in the core network 140. Nonauthoritative edge devices wait for the authoritative edge device to advertise a specific MAC address before they advertise reachability for the MAC address.

Figure 15:
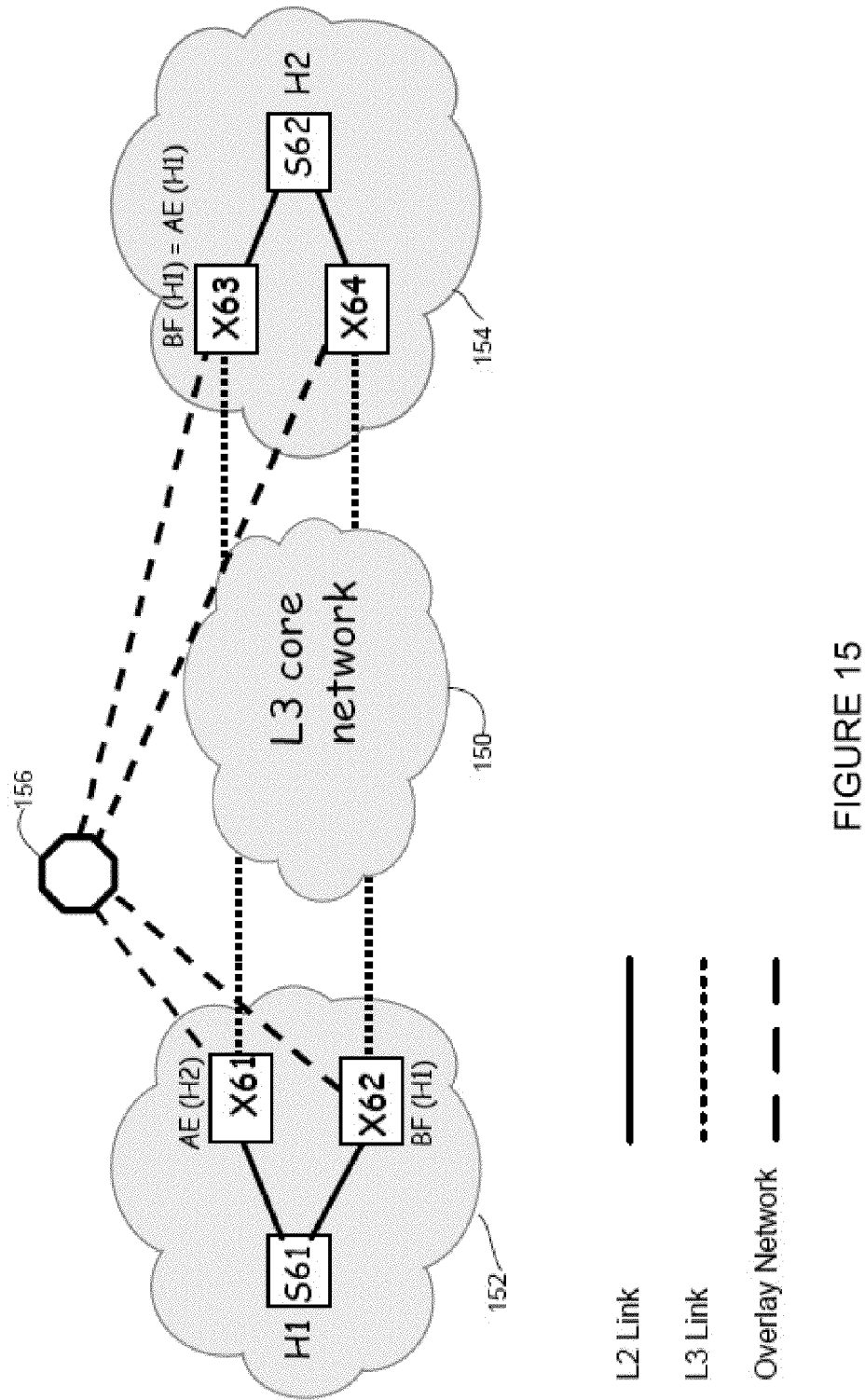
FIG. 15 illustrates a broadcast hash example for use in multi-homing.

FIG. 15 illustrates an example of broadcast hashing for multi-homed sites. Network sites 152 and 154 are connected by core network 150 and overlay network 156. Site 152 includes edge devices X61 and X62 and switch S61 (H1). Site 154 includes edge devices X63 and X64 and switch S62 (H2). In this example, edge device X61 is an authoritative edge device and edge device X62 is a broadcast forwarder (BF) at site 152. Edge device X63 is both an authoritative edge device and a broadcast forwarder at site 154. The broadcast forwarder handles all broadcast traffic for a given source MAC address. Broadcast forwarding involves the choice of a local egress device and a remote ingress device. The broadcast forwarder is determined based on source MAC address for both origin and destination sites, as described below.

The local egress BF (origin site 152 to core 150) is determined at the origin site by performing a hash of source MAC address (local) and local ordinal. The ingress BF (core 150 to destination site 154) is determined at the destination site by performing a hash of source MAC address (remote) and local ordinal. At the destination site, the broadcast forwarder is the same as the authoritative edge device for the source address (AE(SA)) to avoid learning flaps of the source address at the destination site. B-cast traffic received on non-BF edge devices is not forwarded between core and site interfaces.

Referring again to FIG. 15, the following describes symmetric hash decisions for a broadcast hash example. The local egress BF for forwarding broadcast from H1 (source address (SA)) at site 152 (local) to H2 at site 154 (remote) is determined by performing a hash function (f) on the source address and local ordinal for site 152 (O1), as follows: BF(H1) origin=f(SA,LO)=f(H1,O1)=X62

The remote ingress BF is calculated using a source address equal to H1 and the local ordinal of site 154 (O2), as follows: BF(H1)destination=f(SA,LO)=f(H1,O2)=X63=AE(H1). As noted above, the broadcast forwarder at the destination site is equal to the authoritative edge device for the source address.

One characteristic of data centers connected over an L2 or an L3 infrastructure is the motion of virtual servers (hosts) from one site to another. When a multicast source moves across the sites, there is no triggered way to delete the multicast route from the originally detected site in prior art systems. Such systems may rely upon multicast route expiry at the source site based on incoming packet statistics. Such a process is typically in the order of a few minutes. Such a delay may cause blackholing for multicast traffic at a receiver site since the receiver site may continue to choose the old site as the location of the source for multicast traffic until the old source site withdraws the multicast source active advertisement.

Figure 16:
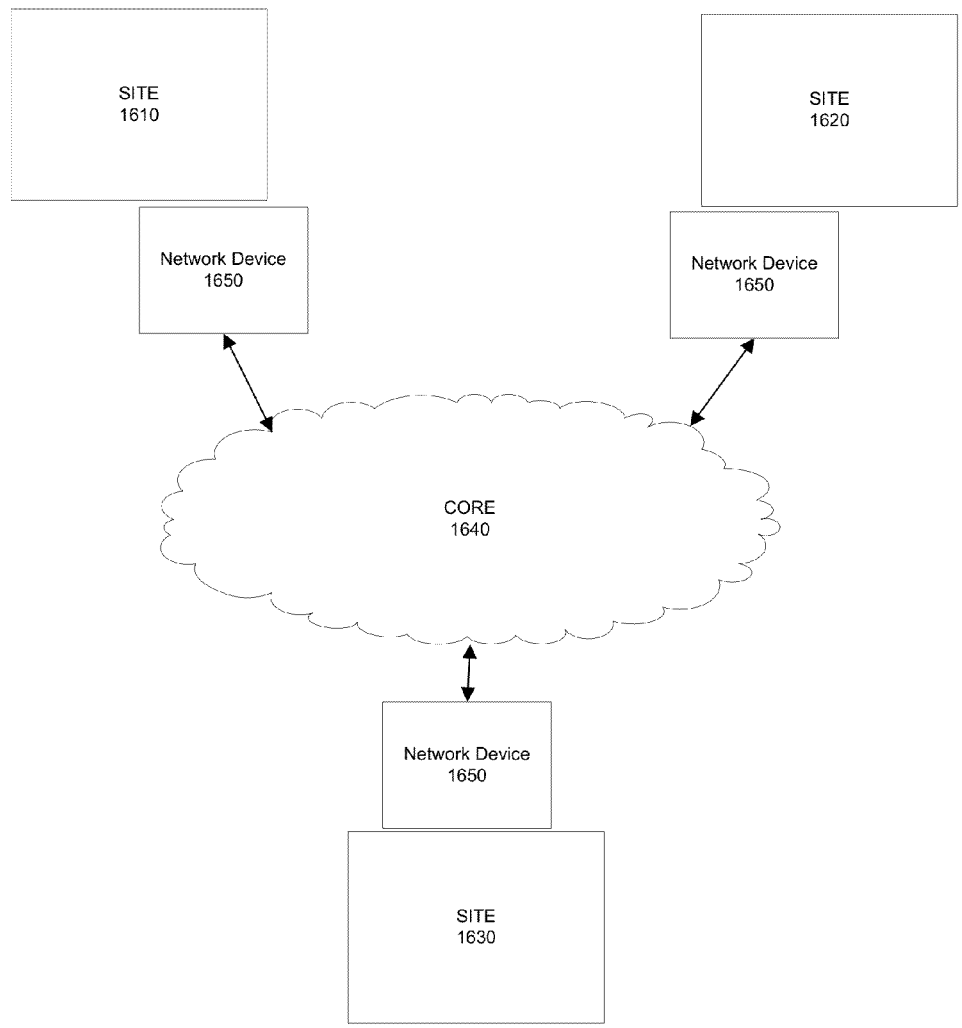
FIG. 16 illustrates operating environments for embodiments of the present disclosure.

FIG. 16 illustrates operating environments for embodiments of the present disclosure. Site 1610, site 1620, and site 1630 each may be in communication through a core 1640. In NX-OS L2 forwarding, multicast frames may be forwarded based on associated IP address information and unicast frames may be forwarded based on associated MAC address information.

Site 1610, site 1620, and site 1630 may represent three disjointed data centers separated by core 1640. Site 1630 may comprise a multicast receiver. For this example, site 1610 may be the initial multicast source. The initial source site 1610 may be detected by network device 1650 associated with site 1610. In some embodiments, network device 1650 may be an OTV edge device. The detected (VLAN, S, G) information may be advertised through OTV-ISIS to remote OTV edge devices, such as network device 1660 and network device 1670. The advertisement may be sent with core encapsulation.

After a network device, such as network device 1670 (identified as a multicast receiver for the group), receives the notification of the active source, the creation of a multicast tree in core 1640 is triggered for provided encapsulation. Multicast source traffic may then be encapsulated and sent by network device 1650 onto core 1640. The traffic will then trace the path along the built multicast tree to reach site 1630. At site 1630, the multicast traffic may be decapsulated and forwarded to the associated receiver.

In some embodiments, the multicast source ("S") may move from site 1610 to site 1620. The source will then be discovered by network device 1660, which may be an OTV edge device associated with site 1620. Subsequently, the OTV-ISIS advertisement may reach network device 1670. Now network device 1670 has two choices to build the multicast tree. Network device 1670 may continue to choose site 1610 and not trigger joining the tree associated with new source site 1620. This may cause blackholing and delay the system.

The control plane component on network device 1650 that is responsible for maintaining discovered (VLAN, S, G) state information will expire the route in the example when it is seen that incoming packet statistics are not incrementing for a pre-determined period of time. In some embodiments, the pre-determined period of time may be between 60 and 180 seconds.

Embodiments of the multicast source move detection feature may ride on existing unicast MAC move features in OTV. The OTV edge device may maintain a mapping database containing (S-MAC, S) information. The mapping database may be populated as soon as a new multicast data stream is detected. The mapping database may be stored along with a (VLAN, S, G) database for locally discovered multicast sources. When a source "S" moves to site 1620 for example, a MAC discovery component on network device 1660 may announce the source S MAC address information. In some embodiments, OTV-ISIS may carry the announcement information to the remote sites 1610 and 1630.

Once network device 1650 detects that the source MAC is now located at a remote site 1620, network device 1650 may go through its mapping database and immediately delete all (VLAN, S, G) active source entries matching source "5". These entries may be subsequently withdrawn from all other sites through an OTV-ISIS GM-LSP update. Network device 1670 may then only see a remote (VLAN, S, G) active source at site 1620. As such, network device 1670 may deterministically join the multicast tree towards network device 1660.

Figure 17:
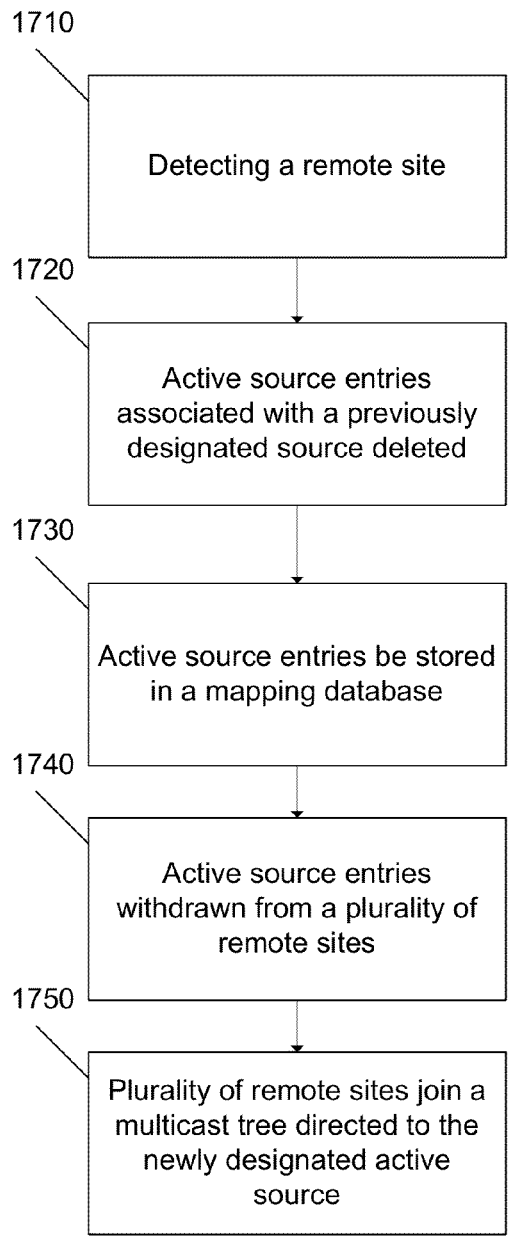
FIG. 17 illustrates a flow chart description of embodiments of the present disclosure.

FIG. 17 is a flowchart describing embodiments of the present disclosure. Method 1700 may begin at step 1710 where a remote site may be detected. The remote site may be a site that has been newly designated as an active source. In some embodiments, the step of detecting occurs on a first network device associated with a first site, wherein the first site comprises the previously active source device. The first network device may be an OTV edge network device. Furthermore, the remote site may be detected based on MAC address information.

Method 1700 may then proceed to step 1720. At step 1720, active source entries associated with a previously designated source may be deleted on a plurality of connected network devices upon detection of the remote site. Method 1700 may then proceed to step 1730. At step 1730, the active source entries may be stored in a mapping database. In some embodiments, mapping databases may be stored in the memories of a plurality of network devices. The mapping database may stores active source entries based at least in part on MAC addresses associated with the active source entries. Furthermore, the mapping database may be sorted based on (VLAN, S, G) route information.

Method 1700 may proceed to step 1740 where active source entries may be withdrawn from a plurality of remote sites through an OTV-ISIS GM-LSP update. Method 1700 may then proceed to step 1750 where the plurality of remote sites may join a multicast tree directed to the newly designated active source. In some embodiments, a deterministic process may be employed to properly add the plurality of remote sites to the multicast tree.

Figure 18:
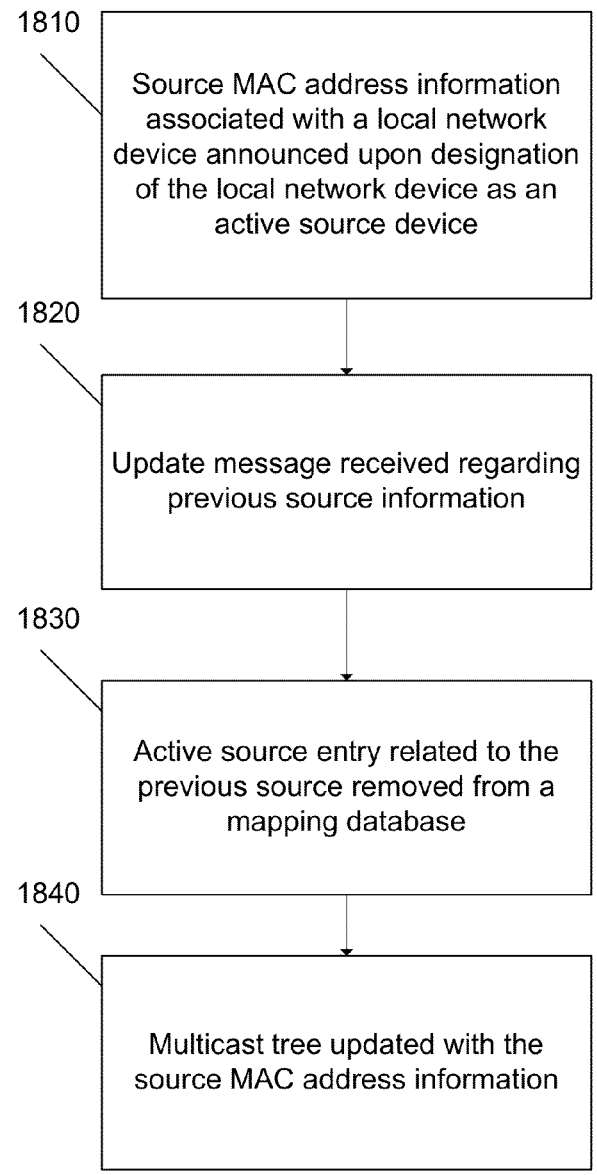
FIG. 18 illustrates a flow chart description of embodiments of the present disclosure.

FIG. 18 is a flow chart illustrating embodiments of the present disclosure. Method 1800 may begin at step 1810 where source MAC address information associated with a local network device may be announced upon designation of the local network device as an active source device. Method 1800 may then proceed to step 1820. At step 1820, an update message may be received regarding previous source information.

Method 1800 may then proceed to step 1830. At step 1830, an active source entry related to the previous source may be removed from a mapping database. Subsequently, at step 1840, a multicast tree may be updated with the source MAC address information. A plurality of remote sites may be added to the multicast tree and traffic will be routed according to the updated multicast tree.

Figure 19:
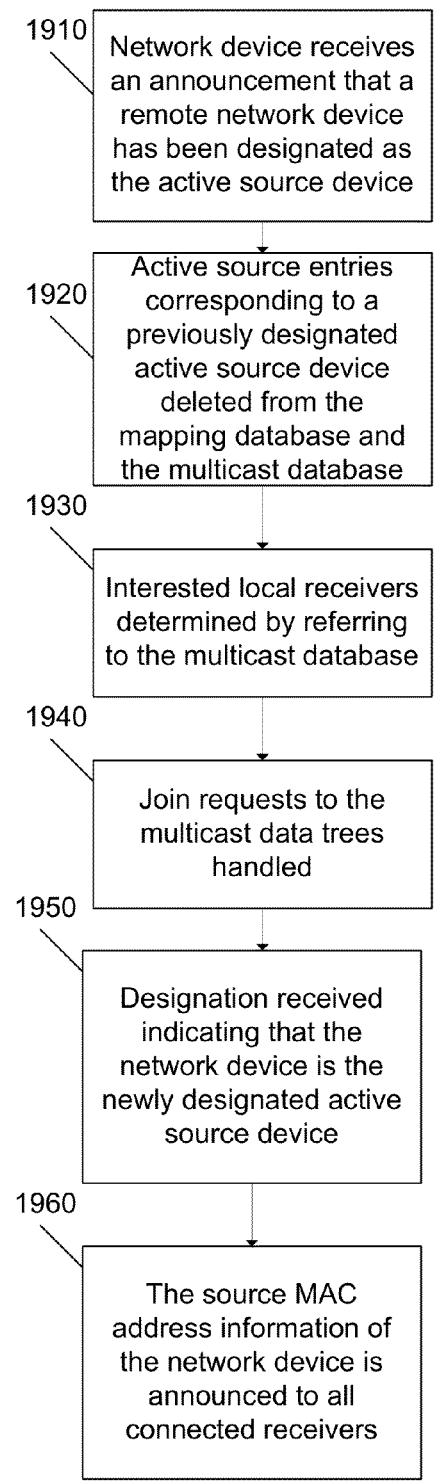
FIG. 19 illustrates a flow chart description of embodiments of the present disclosure.

FIG. 19 is a flow chart illustrating embodiments of the present disclosure. Method 1900 may be performed on a network device comprising a mapping database comprising source MAC address information. The network device may further comprise a multicast database comprising information identifying locally discovered multicast sources. Method 1900 may start at step 1910 where the network device may receive an announcement that a remote network device has been designated as the active source device. In some embodiments, the network device may be an OTV edge network device.

Method 1900 may then proceed to step 1920. At step 1920, active source entries corresponding to a previously designated active source device may be deleted from the mapping database and the multicast database. Method 1900 may then proceed to step 1930 where interested local receivers may be determined by referring to the multicast database. Next, at step 1940, join requests to the multicast data trees may be handled.

Method 1900 may then proceed to step 1950. At step 1950, a designation may be received indicating that the network device is the newly designated active source device. Next, at step 1960 the source MAC address information of the network device may be announced to all connected receivers. In some embodiments, the announcement is made through OTV ISIS messages.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

At least the following is claimed:

1. A method comprising:
   detecting a remote site, wherein the remote site has been newly designated as an active source;
   deleting active source entries associated with a previously designated source on a plurality of connected network devices upon detection of the remote site;
   receiving a designation that the network device is the newly designated active source device; and
   announcing the source MAC address information of the network device to all connected receivers.

2. The method of claim 1, wherein the step of detecting occurs on a first network device associated with a first site, wherein the first site comprises the previously active source device.

3. The method of claim 2, further comprising detecting the remote site based on MAC address information.

4. The method of claim 2, wherein the first network device is an Overlay Transport Virtualization (OTV) edge network device.

5. The method of claim 4, wherein the active source entries are stored in a mapping database.

6. The method of claim 5, wherein the mapping database stores active source entries based at least in part on MAC addresses associated with the active source entries.

7. The method of claim 6, wherein the mapping database is sorted based on (VLAN, S, G) route information.

8. The method of claim 1, further comprising withdrawing active source entries from a plurality of remote sites through an OTV-Intermediate System to Intermediate System (ISIS) Group Membership-Link State Packet (GM-LSP) update.

9. The method of claim 8, further comprising adding the plurality of remote sites to a multicast tree directed to the newly designated active source.

10. The method of claim 9, further comprising employing a deterministic process to add the plurality of remote sites to the multicast tree.

11. A method comprising:
    announcing to all connected receivers source MAC address information associated with a local network device upon receiving a designation of the local network device as an active source device;
    receiving an update message regarding previous source information; and
    removing an active source entry related to the previous source from a mapping database.

12. The method of claim 11, further comprising: updating a multicast tree with the source MAC address information.

13. The method of claim 12, further comprising: receiving multicast traffic routed by the updated multicast tree.

14. The method of claim 13, further comprising: adding a plurality of remote sites to the multicast tree.

15. An OTV edge network device comprising:
    a mapping database comprising source MAC address information;
    a multicast database comprising information identifying locally discovered multicast sources; and
    a processor, wherein the processor is configured to:
      receive an announcement that a remote network device has been designated an active source device;
      delete active source entries corresponding to a previously designated active source device in at least one of the: mapping database and the multicast database;
      receive a designation that the network device is the newly designated active source device; and
      announce the source MAC address information of the network device to all connected receivers.

16. The network device of claim 15 wherein the processor is further configured to:
    determine interested local receivers by referring to the multicast database; and
    handle join requests to one or more multicast data trees.

17. The network device of claim 15, wherein the announcement is made through OTV ISIS messages.

18. The network device of claim 15, wherein source MAC address moves with the designated active source device.

* * * * *